US009270638B2

(12) United States Patent
Thubert et al.

(10) Patent No.: US 9,270,638 B2
(45) Date of Patent: Feb. 23, 2016

(54) MANAGING ADDRESS VALIDATION STATES IN SWITCHES SNOOPING IPV6

(75) Inventors: Pascal Thubert, La Colle sur Loup (FR); Eric Levy-Abegnoli, Valbonne (FR)

(73) Assignee: Cisco Technology, Inc., San Jose, CA (US)

( * ) Notice: Subject to any disclaimer, the term of this patent is extended or adjusted under 35 U.S.C. 154(b) by 1038 days.

(21) Appl. No.: 13/355,032

(22) Filed: Jan. 20, 2012

(65) Prior Publication Data

US 2013/0191463 A1     Jul. 25, 2013

(51) Int. Cl.
*G06F 15/16*     (2006.01)
*G06F 15/173*     (2006.01)
*H04L 29/12*     (2006.01)
*H04L 29/06*     (2006.01)

(52) U.S. Cl.
CPC ........ *H04L 61/6059* (2013.01); *H04L 61/2092* (2013.01); *H04L 63/1466* (2013.01)

(58) Field of Classification Search
USPC ........................................................ 709/206
See application file for complete search history.

(56) References Cited

U.S. PATENT DOCUMENTS

| 7,367,046 | B1 | 4/2008 | Sukiman et al. | |
|---|---|---|---|---|
| 7,506,368 | B1 | 3/2009 | Kersey et al. | |
| 7,953,089 | B1 * | 5/2011 | Ramakrishnan et al. | 370/392 |
| 2003/0026230 | A1 | 2/2003 | Ibanez et al. | |
| 2005/0229244 | A1 | 10/2005 | Khare et al. | |
| 2005/0265261 | A1 | 12/2005 | Droms et al. | |
| 2006/0031315 | A1 | 2/2006 | Fenton et al. | |
| 2006/0159100 | A1 | 7/2006 | Droms et al. | |
| 2007/0070921 | A1 | 3/2007 | Quinlan et al. | |
| 2007/0121617 | A1 | 5/2007 | Kanekar et al. | |
| 2007/0195774 | A1 | 8/2007 | Sherman et al. | |
| 2008/0130647 | A1 * | 6/2008 | Ohba et al. | 370/392 |
| 2008/0162936 | A1 * | 7/2008 | Haddad | 713/171 |
| 2008/0263353 | A1 * | 10/2008 | Droms et al. | 713/153 |
| 2008/0304457 | A1 | 12/2008 | Thubert et al. | |

(Continued)

OTHER PUBLICATIONS

Vinci, et al., "Notification of Transmittal of the International Search Report and the Written Opinion of the International Searching Authority, or the Declaration", Patent Cooperation Treaty, International Appl. No. PCT/US2013/022102, mailed Apr. 12, 2013, 9 pages, European Patent Office, Rijswijk, Netherlands.

(Continued)

*Primary Examiner* — Melvin H Pollack
(74) *Attorney, Agent, or Firm* — Parker Ibrahim & Berg LLC; James M. Behmke; Stephen D. LeBarron

(57) ABSTRACT

In one embodiment, a particular device (e.g., switch) receives a neighbor discovery (ND) message from a non-trusted non-switch device, the ND message having an associated address, and creates a corresponding binding entry for the address in a temporary tentative state without forwarding the ND message. In addition, the switch then generates and forwards a first duplicate address detection (DAD) message on behalf of the non-trusted non-switch device. In response to receiving a second DAD message from a non-owner device, the switch may either drop the second DAD message when a corresponding second address of the second DAD message is stored as a tentative-state entry, or else forward the second DAD message to a corresponding owner device of the second address for neighbor advertisement (NA) defense when the second address is not stored as a tentative-state entry.

20 Claims, 28 Drawing Sheets

(56) References Cited

U.S. PATENT DOCUMENTS

| | | | |
|---|---|---|---|
| 2008/0307516 A1 | 12/2008 | Levy-Abegnoli et al. | |
| 2010/0296481 A1* | 11/2010 | Weniger et al. | 370/331 |
| 2010/0313265 A1* | 12/2010 | Lin et al. | 726/22 |
| 2010/0322420 A1* | 12/2010 | Al-Banna et al. | 380/255 |
| 2011/0093571 A1* | 4/2011 | Gorg et al. | 709/220 |
| 2011/0182293 A1* | 7/2011 | Seo et al. | 370/392 |
| 2011/0206012 A1* | 8/2011 | Youn et al. | 370/332 |
| 2012/0084364 A1* | 4/2012 | Sivavakeesar | 709/205 |
| 2012/0128001 A1* | 5/2012 | Ooghe et al. | 370/392 |
| 2012/0224576 A1* | 9/2012 | Gu et al. | 370/390 |
| 2012/0287932 A1* | 11/2012 | Haddad et al. | 370/392 |
| 2012/0314624 A1* | 12/2012 | Asati et al. | 370/257 |
| 2013/0003600 A1* | 1/2013 | Jennings | 370/254 |
| 2013/0212249 A1* | 8/2013 | Groat et al. | 709/223 |
| 2013/0294451 A1* | 11/2013 | Li et al. | 370/392 |
| 2014/0092779 A1* | 4/2014 | Seok et al. | 370/254 |
| 2014/0126581 A1* | 5/2014 | Wang et al. | 370/431 |
| 2014/0325090 A1* | 10/2014 | Michelin et al. | 709/245 |

OTHER PUBLICATIONS

Bagnulo, et al., "SEND-Based Source-Address Validation Implementation", draft-ietf-savi-send-06, IETF Internet Draft, Oct. 2011, 30 pages.

Bi, et al., "SAVI for Mixed Address Assignment Methods Scenario", draft-ietf-savi-mix-01, IETF Internet Draft, Oct. 2011, 9 pages.

Bi, et al., "SAVI Solution for DHCP", draft-ietf-savi-dhcp-11.txt, IETF Internet Draft, Dec. 2011, 27 pages.

McPherson, et al., "SAVI Threat Scope", draft-ietf-savi-threat-scope-05, IETF Internet Draft, Apr. 2011, 23 pages.

Narten, et al., "Neighbor Discovery for IP Version 6 (IPv6)", IETF Request for Comments, Sep. 2007, 98 pages.

Narten, et al., "Neighbor Discovery for IP Version 6 (IPv6)", IETF Request for Comments, Dec. 1998, 93 pages.

Narten, et al., "Neighbor Discovery for IP Version 6 (IPv6)", IETF Request for Comments, Aug. 1996, 83 pages.

Nordmark, et al., "FCFS SAVI: First-Come First-Serve Source-Address Validation for Locally Assigned IPv6 Addresses", draft-ieft-savi-fcfs-10, IETF, Network Working Group, Nov. 2011, 33 pages.

Shelby, et al., "Neighbor Discovery Optimization for Low Power and Lossy Networks (6LoWPAN)", draft-ietf-6lowpan-nd-18, IETF Internet Draft, Oct. 2011, 60 pages.

Thomson, et al., "IPv6 Stateless Address Autoconfiguration", IETF Request for Comments, Sep. 2007, 30 pages.

Thomson, et al., "IPv6 Stateless Address Autoconfiguration", IETF Request for Comments, Dec. 1998, 26 pages.

Thomson, et al., "IPv6 Stateless Address Autoconfiguration", IETF Request for Comments, Aug. 1996, 22 pages.

Thubert, et al., "LoWPAN Backbone Router", draft-ietf-lowpan-backbone-router-00, IETF Internet Draft, Nov. 2007, 16 pages.

Wu, et al., "Source Address Validation Improvement Framework", draft-ietf-savi-framework-06, IETF Internet Draft, Dec. 2011, 16 pages.

* cited by examiner

MANAGING ADDRESS VALIDATION STATES IN SWITCHES SNOOPING IPV6

TECHNICAL FIELD

The present disclosure relates generally to computer networks, and, more particularly, to Internet Protocol version 6 (IPv6) duplicate address detection (DAD).

BACKGROUND

Switches are required to be more and more IPv6 aware in order to protect the network against rogue or uncontrolled behaviors, particularly in secure environments. For instance, one aspect required by IPv6 switches is to maintain binding entries where the switch maintains a mapping of which switch (e.g., which port on which switch) owns a given IPv6 address. Notably, such management operations have to be consistent with switches that support snooping operations, and switches that do not.

The Source Address Validation Improvements (SAVI) Working Group at the Internet Engineering Task Force (IETF) has been studying ways to maintain such entries. In general, there are pros and cons to the current approaches developed by SAVI, but one particular shortcoming is the lack of a first-come-first-serve protection against rogue is devices that steal addresses that may be "seen" through the duplicate address detection (DAD) process, that is, stolen based on observing public traffic flow.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a particular device (e.g., switch) receives a neighbor discovery (ND) message from a non-trusted non-switch device, the ND message having an associated address, and creates a corresponding binding entry for the address in a temporary tentative state without forwarding the ND message. In addition, the switch then generates and forwards a first duplicate address detection (DAD) message on behalf of the non-trusted non-switch device. In response to receiving a second DAD message from a non-owner device, the switch may either drop the second DAD message when a corresponding second address of the second DAD message is stored as a tentative-state entry, or else forward the second DAD message to a corresponding owner device of the second address for neighbor advertisement (NA) defense when the second address is not stored as a tentative-state entry.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

Figure 1:
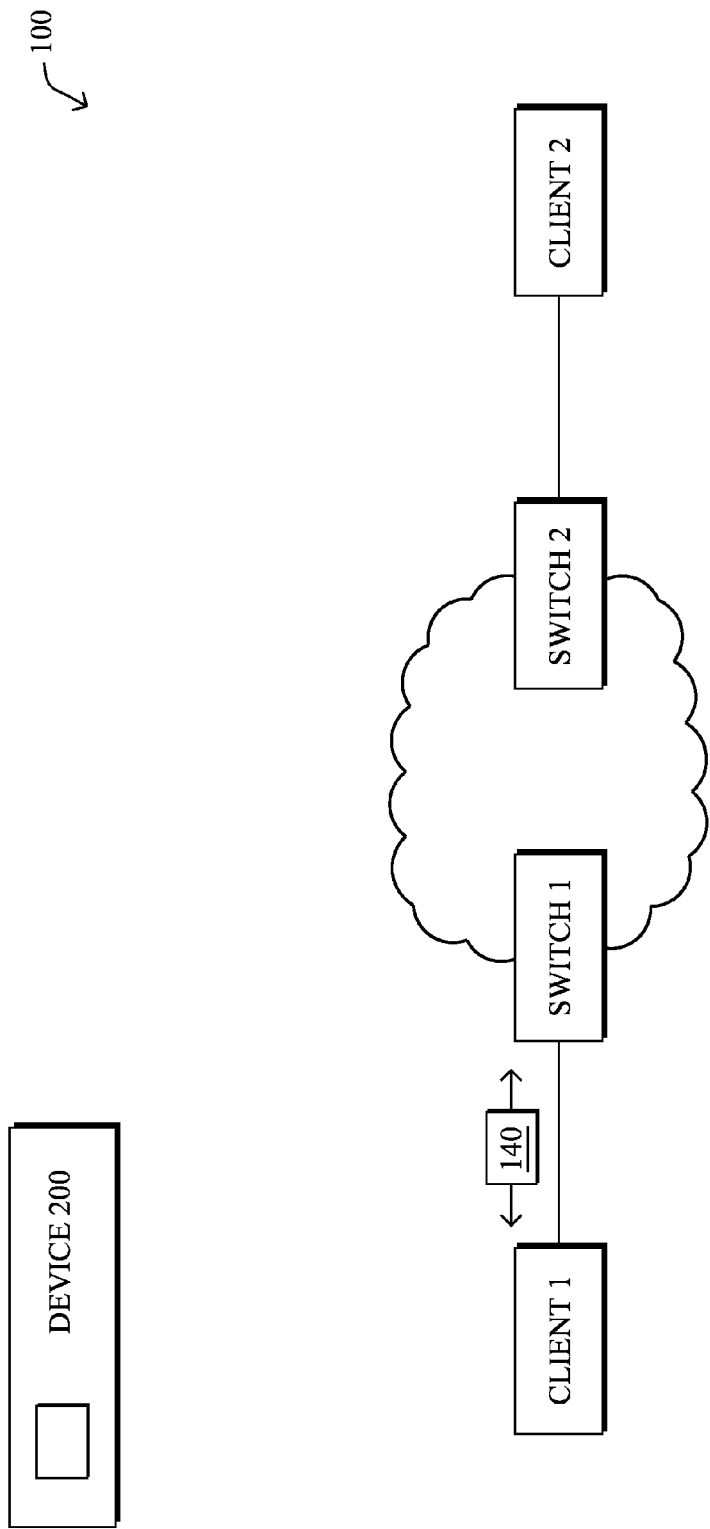
FIG. 1 illustrates an example communication network.

FIG. 1 is a schematic block diagram of an example computer network 100 illustratively comprising nodes/devices 200 such as one or more client devices (e.g., "client 1," "client 2," etc.) and one or more intermediate devices/switches (e.g., "switch 1," "switch 2," etc.), interconnected by various methods of communication. For instance, the links may be wired links or shared media (e.g., wireless links, PLC links, etc.) where certain nodes 200 may be in communication with other nodes 200 (e.g., based on physical connection configuration) current operational status, distance, signal strength location, etc. Those skilled in the art will understand that any number of nodes, devices, links, etc. may be used in the computer network, and that the view shown herein is for simplicity.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
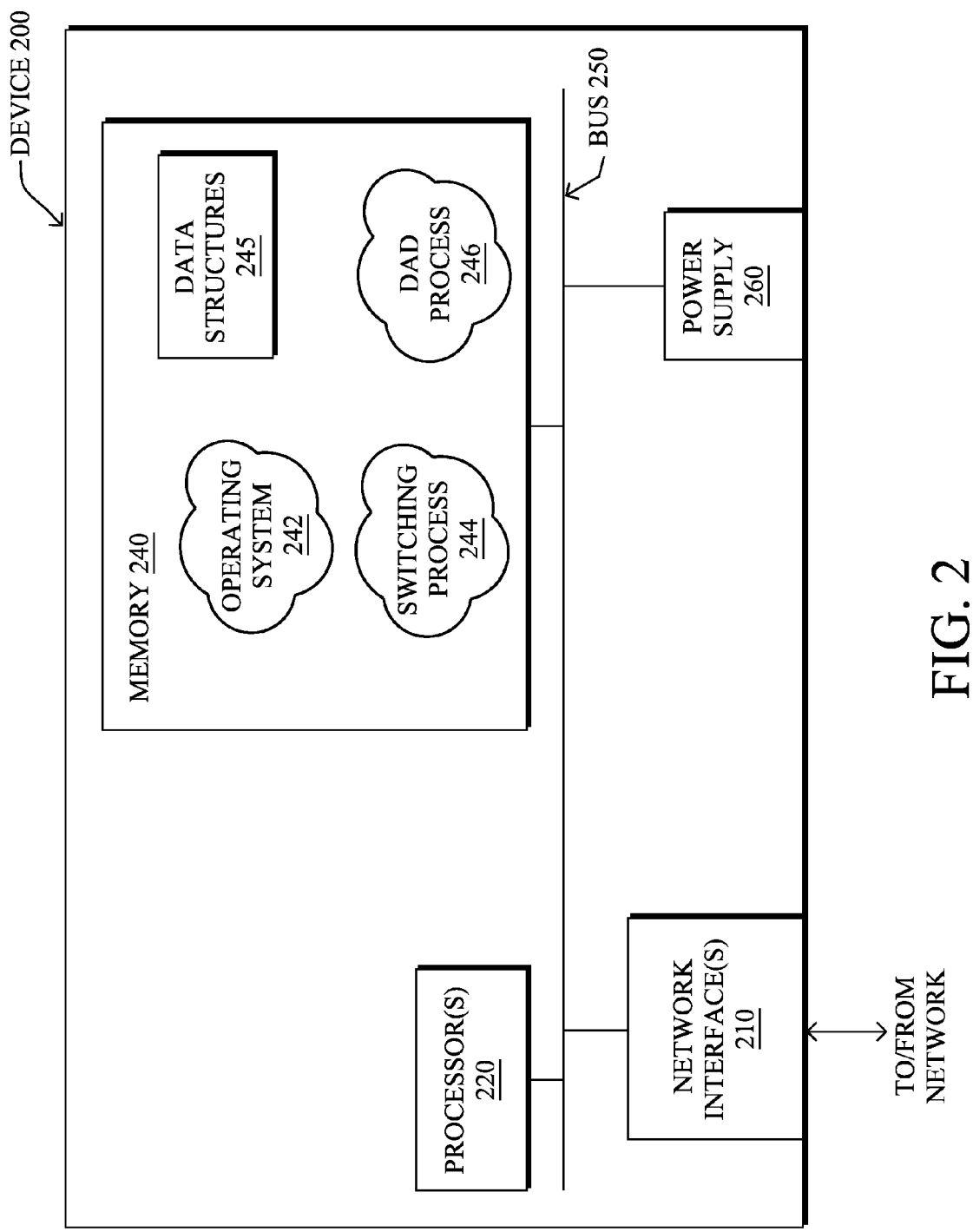
FIG. 2 illustrates an example network device/node.
Figure 3:
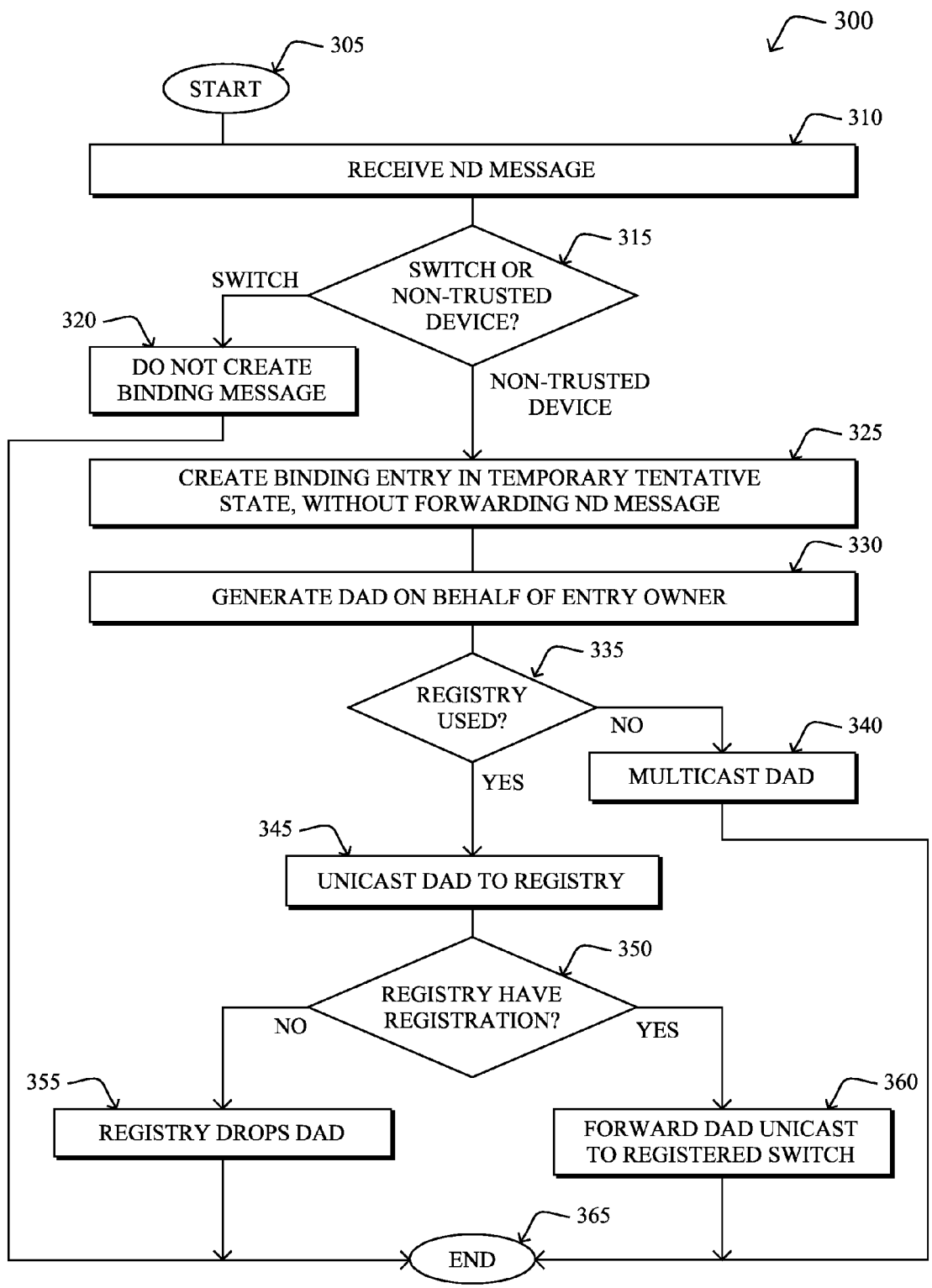
FIGS. 3-5 illustrate example simplified procedures for managing address validation state in switches snooping IPv6.

FIG. 2 is a schematic block diagram of an example node/device 200 that may be used with one or more embodiments described herein, e.g., as any of the nodes shown in FIG. 1 above, particularly switches as described below. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise an illustrative switching process/services 244, as well as an illustrative duplicate address detection (DAD) process 248. Note that while the switching process 244 and DAD process 248 are shown in centralized memory 240, alternative embodiments provide for one or both of the processes to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Illustratively, the techniques described herein may be performed by hardware, software, and/or firmware, such as in accordance with the switching process 244 and/or DAD process 248, which may each contain computer executable instructions executed by the processor 220 to perform functions relating to the techniques described herein. For instance, switching process (services) 244 and DAD process 248 may contain computer executable instructions executed by the processor 220 to perform functions provided by one or more switching protocols, as will be well understood by those skilled in the art. Such functions may be based on conventional protocols to manage forwarding states, port blocking, address resolution, etc. According to one or more embodiments described herein, therefore, switching process 244 and DAD process 248 (which may itself be a sub-process of the switching process 244) may be extended, modified, or replaced with the functionality described herein.

In particular, as noted above, switches are required to be more and more IPv6 aware in order to protect the network against rogue or uncontrolled behaviors, particularly in secure environments. For instance, one aspect required by IPv6 switches is to maintain binding entries where the switch maintains a mapping of which switch (e.g., which port on which switch) owns a given IPv6 address. Notably, such management operations have to be consistent with switches that support snooping operations, and switches that do not. The Source Address Validation Improvements (SAVI) Working Group at the Internet Engineering Task Force (IETF) has been studying ways to maintain such entries. The following references, which are drafts available from the IETF and are each incorporated by reference in their entirety herein, are examples of current SAVI protocols:

"SAVI Solution for DHCP"<draft-ietf-savi-dhcp-11>, by J. Bi et al. (Dec. 28, 2011 edition);
"FCFS SAVI: First-Come First-Serve Source-Address Validation for Locally Assigned IPv6 Addresses"<draft-ietf-savi-fcfs> by Erik Nordmark et al. (Nov. 22, 2011 edition);
"Source Address Validation Improvement Framework"<draft-ietf-savi-framework> by Jianping Wu, et al. (Dec. 27, 2011 edition);
"SAVI for Mixed Address Assignment Methods Scenario"<draft-ietf-savi-mix> by Jun Bi et al. (Oct. 26, 2011 edition);
"SEND-based Source-Address Validation Implementation"<draft-ietf-savi-send> by Marcelo Bagnulo, et al. (Oct. 4, 2011 edition); and
"SAVI Threat Scope"<draft-ietf-savi-threat-scope> by Danny McPherson, et al. (Apr. 11, 2011 edition).

Note in addition that the following Request for Comment (RFC) documents relating to IPv6 are also incorporated by reference in their entirety:

RFC 4861, "Neighbor Discovery for IP version 6 (IPv6)" by T. Narten, et al. (September 2007 edition, obsoleting RFCs 2461 and 1970); and
RFC 4862, "IPv6 Stateless Address Autoconfiguration" by S. Thomson, et al. (September 2007 edition, obsoleting RFCs 2462 and 1971).

As also noted above, there are pros and cons to the current approaches developed by SAVI, but one particular shortcoming is the lack of a first-come-first-serve protection against rogue devices that steal addresses that may be seen through the duplicate address detection (DAD) process. The techniques herein, therefore, provide for distributing neighbor discovery (ND) binding table states in switches that protect the first device that claims an address, while still allowing overrides based on a configurable trust.

Operationally, according to the embodiments described herein, the techniques propose a particular use of the standard DAD message that protects the first user of a given IPv6 address, which may be described generally with reference to FIGS. 3-7, of which FIGS. 3-5 and 7 illustrate example simplified procedures (300, 400, 500, and 700, respectively) for managing address validation state in switches snooping IPv6 in accordance with one or more embodiments described herein.

In particular, based on procedure 300, which may start in step 305, upon receiving a neighbor discovery (ND) message (with an associated address) in step 310, it may first be determined whether the message arrived from a "non-trusted" non-switch device in step 315 (where levels of trust may be configured, as described herein and as understood in the art). If the message is from a switch, then no binding entry is created in step 320; that is, binding entries are not created for devices that are reached over switches. However, if the message is from a non-trusted non-switch device, then in step 325 a corresponding binding entry for the address is created in the receiving switch (e.g., in a binding entry table, such as a data structure 245), notably without forwarding the ND message. In accordance with the embodiments herein, the entry is created in a temporary TENTATIVE state (which, for example, echoes the probable ND state in the device, even though the state in the device might be different). This state may illustratively last (be held for) 800 ms in a specific example embodiment. As will be understood in the art, and as may be described below, other states may comprise INCOMPLETE, REACHABLE, VERIFY, DOWN, and STALE.

Rather than forwarding the ND message, in step 330 the Binding Table support of the receiving switch (e.g., DAD process 248) generates a DAD message on behalf of the entry owner device, and forwards it as described below (e.g., to poll other switches (for multiswitch operation)). Note also that ND message themselves may be correspondingly policed (e.g., blocking advertisements with a Source or Target Link Layer Address Option (S/T LLAO) until DAD is performed with other (trusted) switches).

In particular, the techniques herein allow for a centralized or a distributed registry (e.g., a distributed hash table or "DHT") configured to maintain a database of entries. If there is no registry in step 335, then the DAD message is sent as a traditional multicast in step 340. If there is such a registry in step 335, however, then the generated DAD message is sent unicast to the registry in step 345. Note that the registry may determine in step 350 whether it has a registered device for the address. If there is a registry and the registry has no registration (no registered device) for the unicast DAD message from the switch, then the registry drops the DAD message in step 355. However, if it has an entry pointing to a registered switch (a registered device), then it forwards the DAD message (e.g., unicast) to that registered switch. The procedure 300 may end in step 365, and may continue to either of procedures 400 or 500 below.

Figure 4:
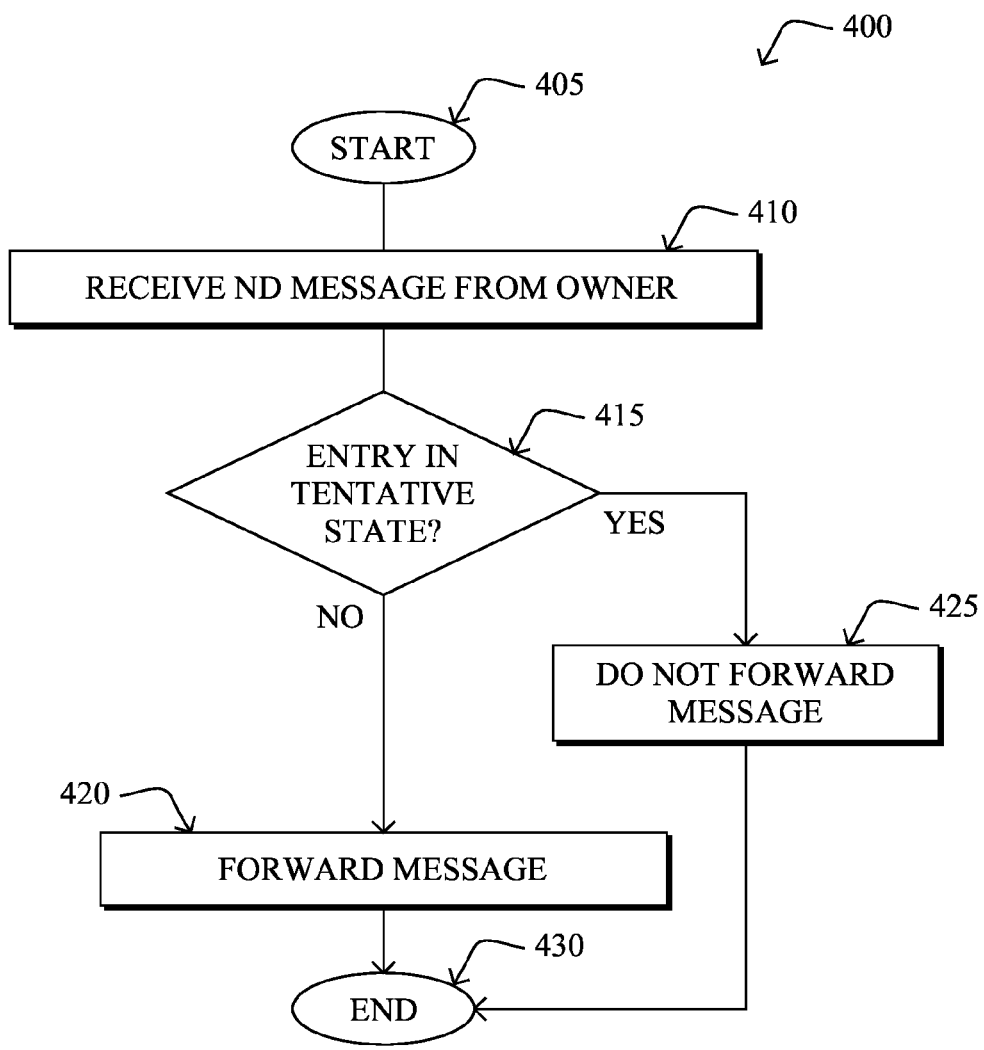

For instance, procedure 400 of FIG. 4 may start at step 405, and continues to step 410 where any new ND message is received from the "owner" device for the associated address (entry), that is, the device who "owns" the address entry. Based on determining whether the address of the ND message is already an entry in a TENTATIVE state in step 415, the DAD message is forwarded in step 420 only in response to the address not already being an entry in the tentative state. In other words, the ND message is not forwarded (nor is an entry created) as long as the entry is already in a TENTATIVE state (i.e., step 425). The procedure 400 may end in step 430.

Figure 5:
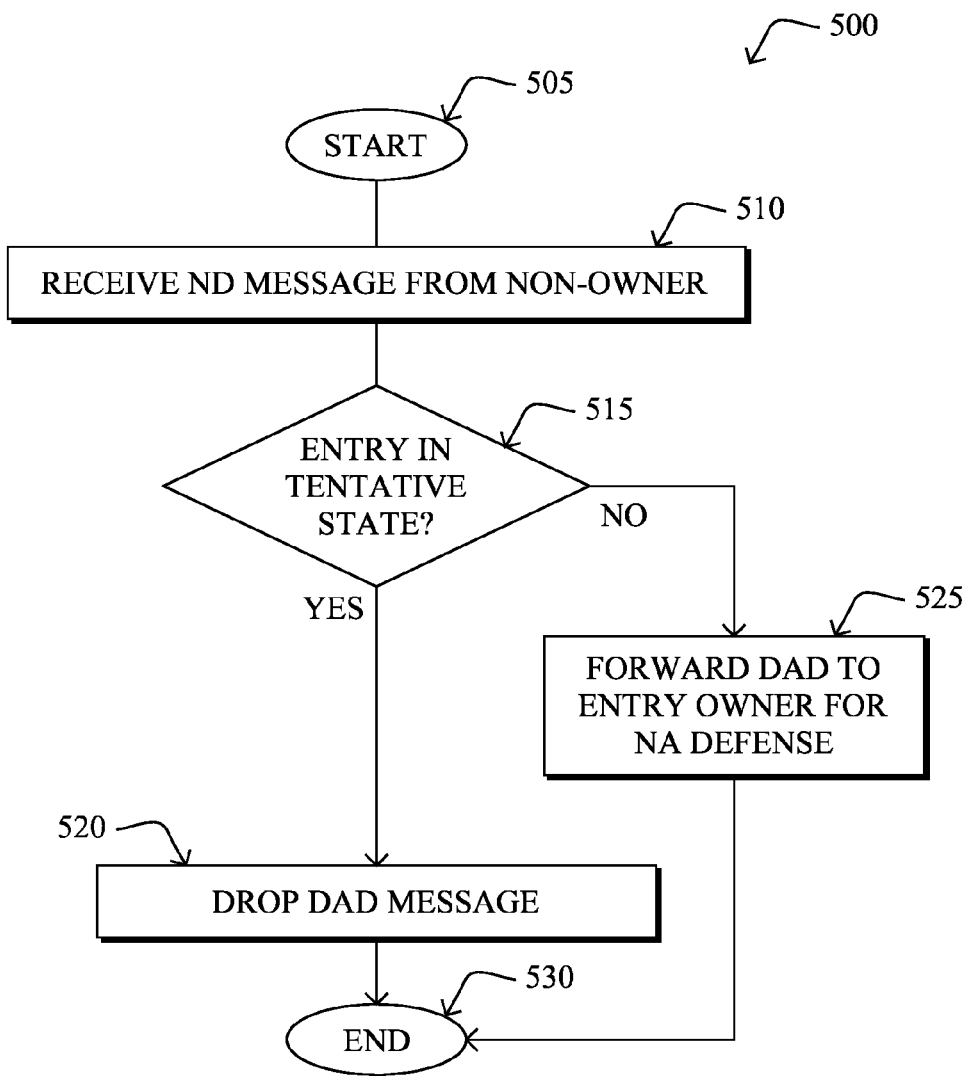

As shown in procedure 500 of FIG. 5 (which may start in step 505), upon receiving a DAD message from another (non-owner) device in step 510, it may again be determine whether the associated address/entry corresponding to this received DAD message is one already stored in the TENTATIVE state (i.e., as a tentative-state entry) in step 515. If it is, then the DAD message is not passed on to the device, but is dropped in step 520. However, upon receiving a DAD message for an entry that is not stored as a tentative-state entry (i.e., is in the TENTATIVE state) in step 515, then the receiving switch forwards the DAD message in step 525 to the entry owner (corresponding owner device) so that it can defend itself with a neighbor advertisement (NA) defense. The procedure 500 ends in step 530.

Figure 6:
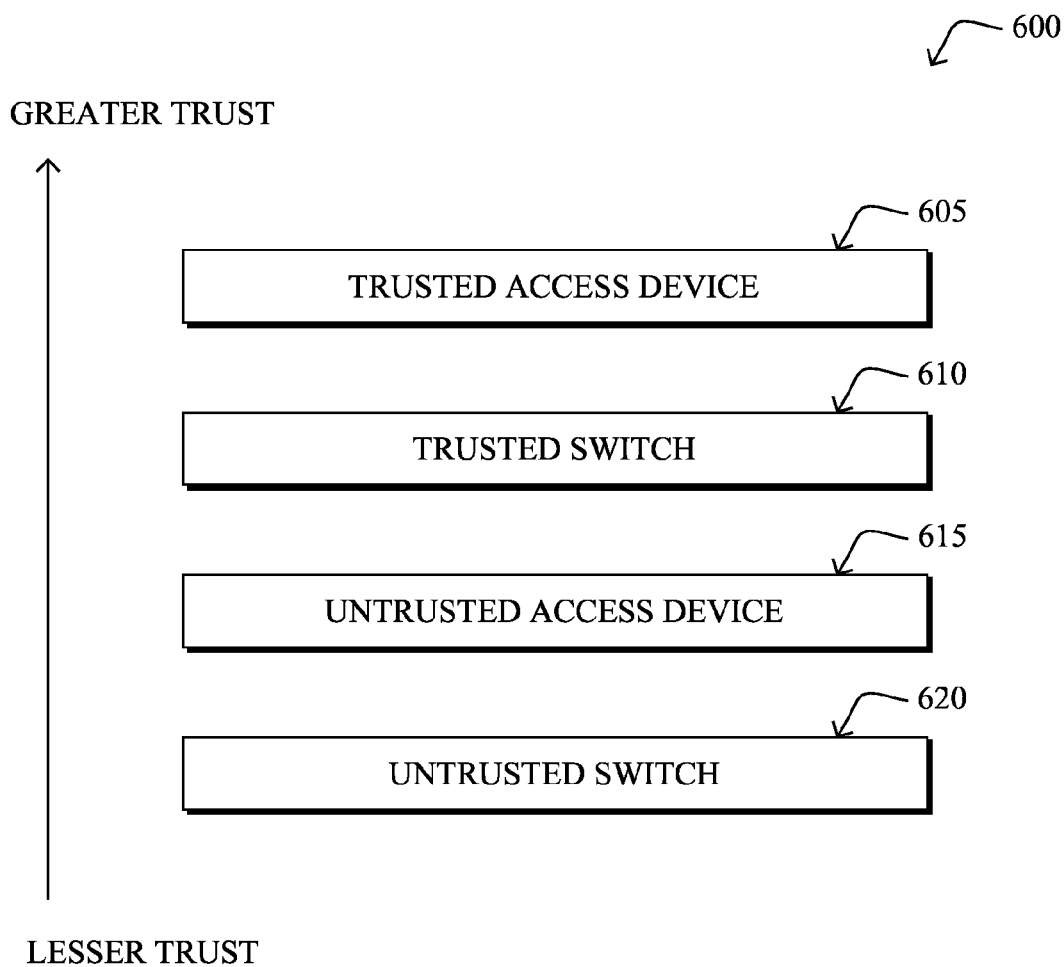
FIG. 6 illustrates an example trust relationship.

In general, a switch can be configured as a device role for snooping, and can be trusted or not. FIG. 6 illustrates an example configured trust relationship in accordance with an illustrative embodiment herein, where different devices may be associated with configured levels of trust, as may be appreciated by those skilled in the art (e.g., based on configuration, network sharing, etc.). In particular, the types of devices in order from most trusted device to least trusted device, are: a trusted access device (node) 605, a trusted switch 610, an untrusted access device, and an untrusted switch. In other words, a switch that maintains entries is seen as trusted by other switches, a trusted switch is less trusted than a trusted access, but more trusted than an untrusted access, which in turn is more trusted than an untrusted switch.

Figure 7:
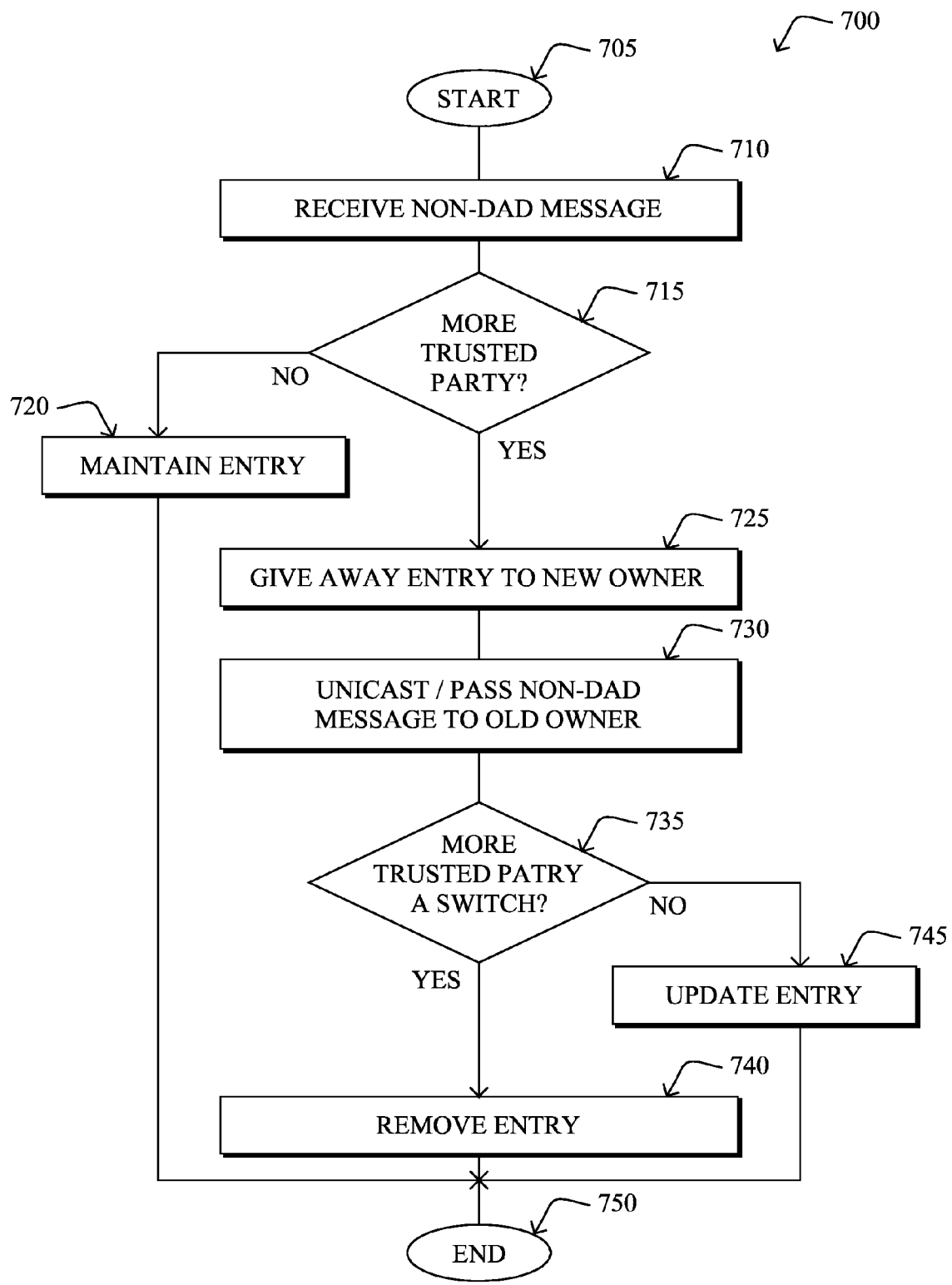
FIG. 7 illustrates another example simplified procedure for managing address validation state in switches snooping IPv6.

According to the techniques herein, therefore, override provisions based on levels of trust are also provided, such as in accordance with procedure 700 of FIG. 7. According to procedure 700, which may start in step 705, a switch that receives a NON-DAD message in step 710 determines in step 715 if the NON-DAD message was received from a more trusted party. If not, then in step 720 the corresponding address entry is maintained. However, if it is a more trusted party, then in step 725 the switch gives away the current entry to the new owner, and passes the NON-DAD message in unicast to the old owner in step 730, such that it might "clean up" its addresses depending on state and implementation. Notably, in response to the more trusted party being a switch in step 735, that is, if the "winner" is seen over a switch, then in step 740 the particular entry is simply removed. Conversely, in response to the more trusted party not being a switch, then in step 745 the entry is updated to reflect the more trusted party (winning device) as the owner of the address of the non-DAD message. The procedure 700 may end in step 750.

It should be noted that while certain steps within procedures 300-500 and 700 may be optional as described above, the steps shown in FIGS. 3-5 and 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 300-500 and 700 are described separately, certain steps from each procedure may be incorporated into each other procedure, and the procedures are not meant to be mutually exclusive.

The results of the procedures 300-500 and 700 may be better understood with reference to the example message exchange diagrams described below.

Figure 8:
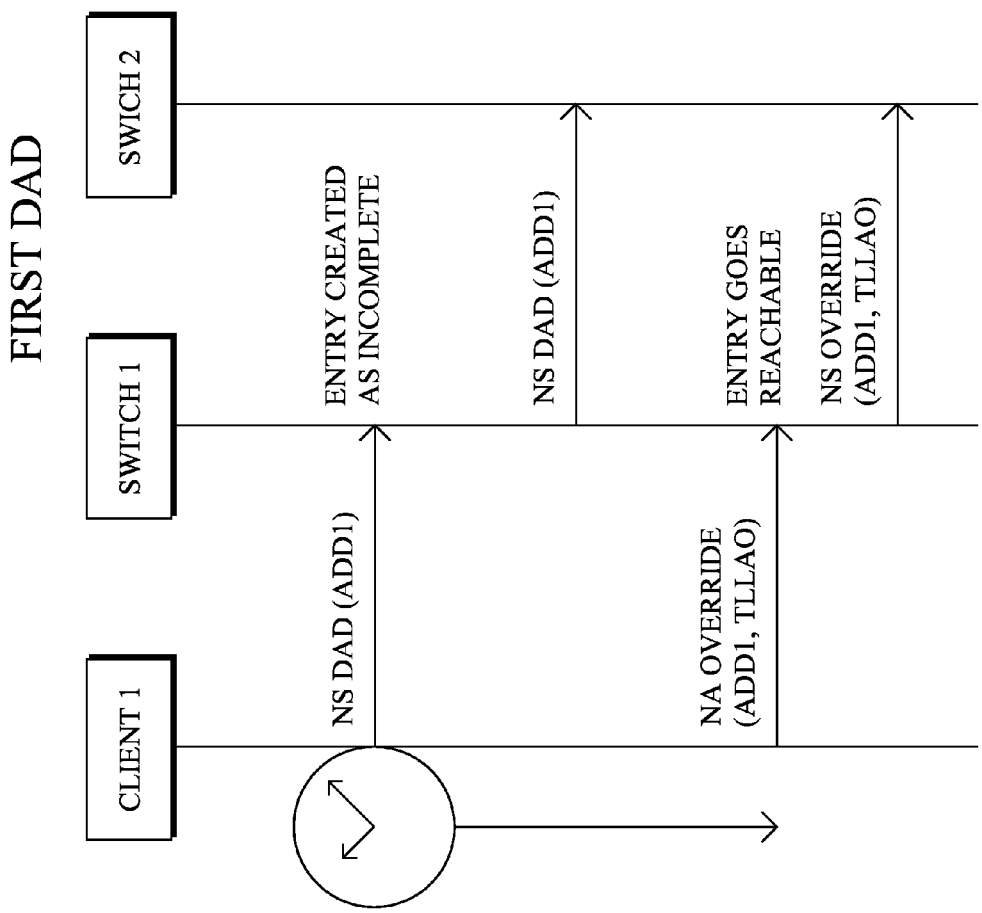
FIGS. 8-13 illustrate example message exchange timing diagrams for where a local port is trusted.

In particular, according to the techniques herein, FIGS. 8-13 illustrate example message exchange timing diagrams for where a local port is trusted. FIG. 8 shows Switch 1 receiving a first DAD message from Client 1 (NS DAD) for address "ADD1." Switch 1 creates the corresponding entry as INCOMPLETE, and forwards the NS DAD (ADD1) to Switch 2. Client 1 has initiated a delay timer upon sending the NS DAD, and upon expiration sends a corresponding NA Override message (ADD1, TLLAO) to Switch 1. At this time, the entry goes REACHABLE, and the NA Override (ADD1, TLLAO) is forwarded to Switch 2.

Figure 9:
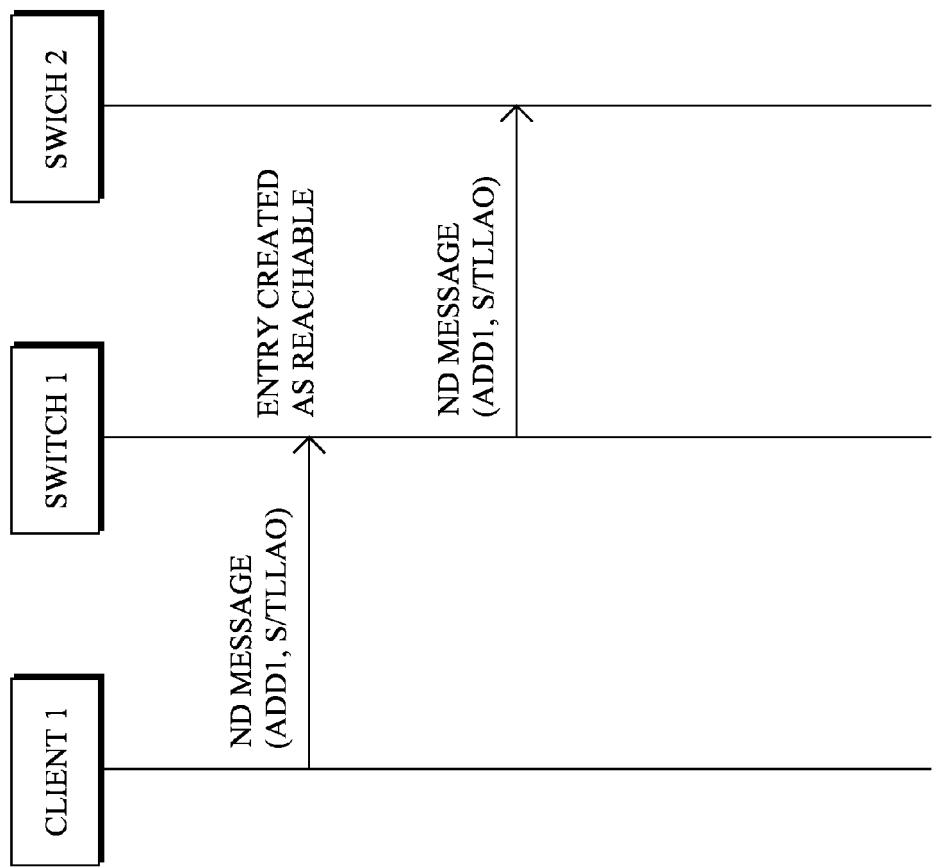

FIG. 9 illustrates a first non-DAD ND/LLAO message scenario, where Client 1 sends an ND message (ADD1, S/TLLAO) to Switch 1, at which time the entry may be created as REACHABLE. The ND message (ADD1, S/TLLAO) may then be forwarded to Switch 2.

Figure 10:
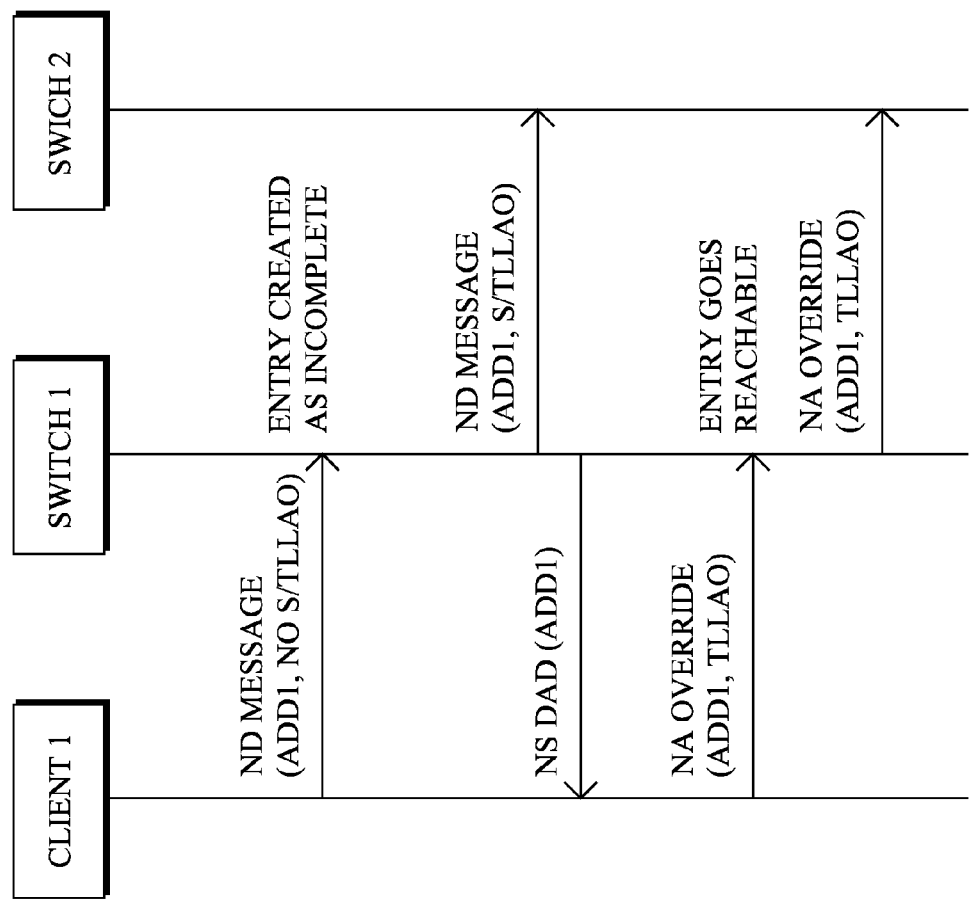

FIG. 10, on the other hand, illustrates a first non-DAD ND message (without LLAO). In this instance, Client 1 sends the ND message (ADD1, no S/TLLAO) to Switch 1, which then creates the entry as INCOMPLETE, and forwards the ND message (ADD1, no S/TLLAO) to Switch 2. Next, Switch 1 returns an NS DAD message (ADD1) to Client 1, which may then correspondingly return an NA Override message (ADD1, TLLAO) back to Switch 1. Accordingly, the entry at Switch 1 goes REACHABLE, and the NA Override (ADD1, TLLAO) is forwarded to Switch 2.

Figure 11:
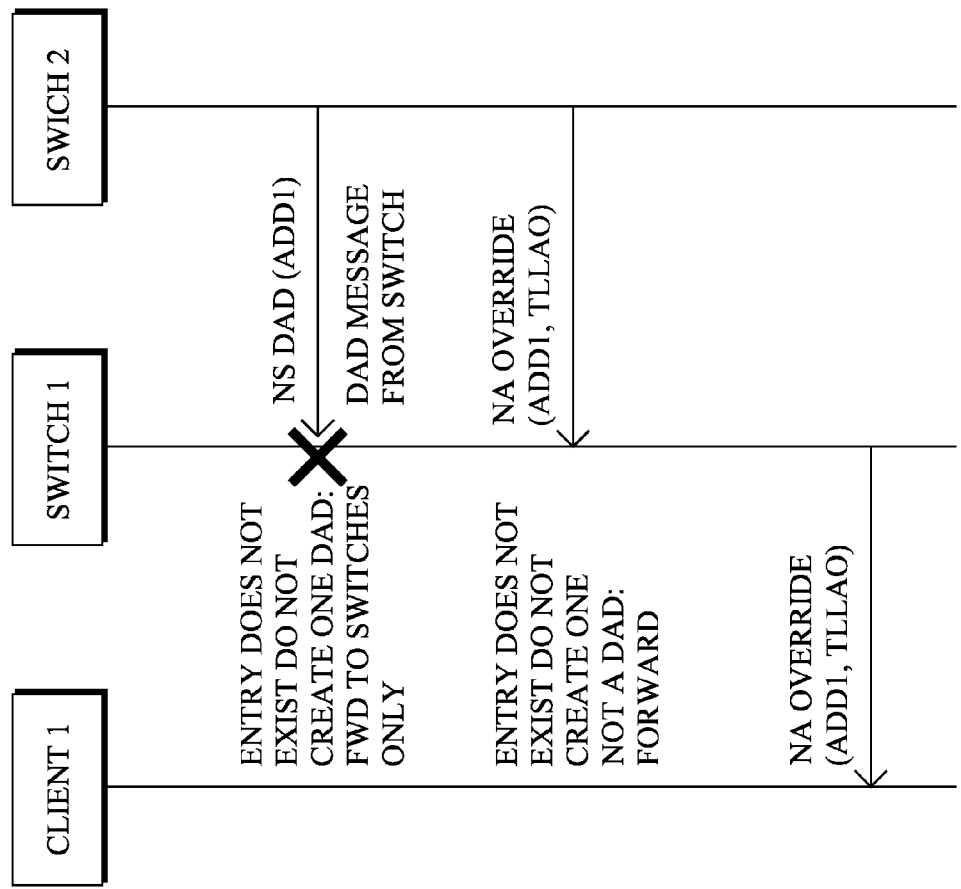

FIG. 11 illustrates the receipt of a DAD message from a switch, particularly receiving an NS DAD (ADD1) at Switch 1 from Switch 2. At this time, if the entry does not exist for the DAD message from a switch, an entry is not created, and any DAD messages are forwarded to other switches, only. Switch 2 may later send an NA Override message (ADD1, TLLAO), and Switch 1, though still not creating the entry, forwards the NA Override message (ADD1, TLLAO) to Client 1, since the message is not a DAD message.

Figure 12:
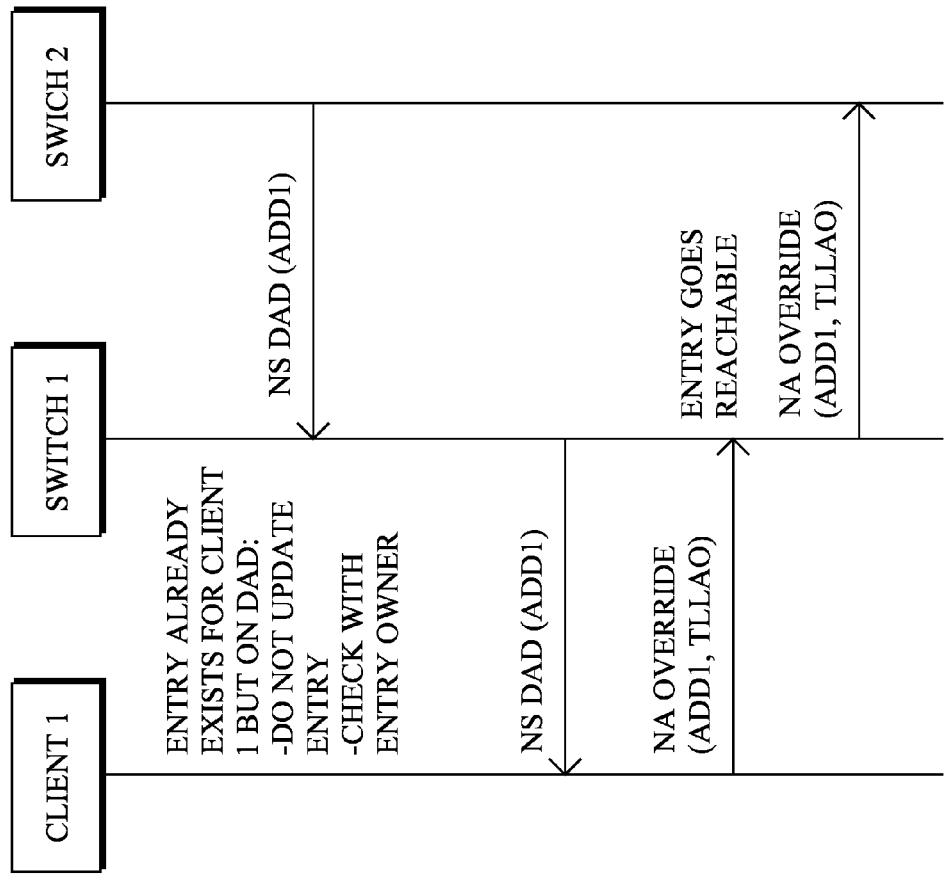

FIG. 12, conversely, illustrates another receipt of a DAD message from a switch, but now when Switch 1 receives the NS DAD (ADD1), the entry already exists for Client 1. At this time, the entry is not updated, but Switch 1 checks with the entry owner by sending the NS DAD (ADD1) to Client 1 (the owner). If Client 1 returns an NA Override (ADD1, TLLAO)

to Switch 1, then the entry goes REACHABLE, and the NA Override (ADD1, TLLAO) is forwarded to Switch 2.

Figure 13:
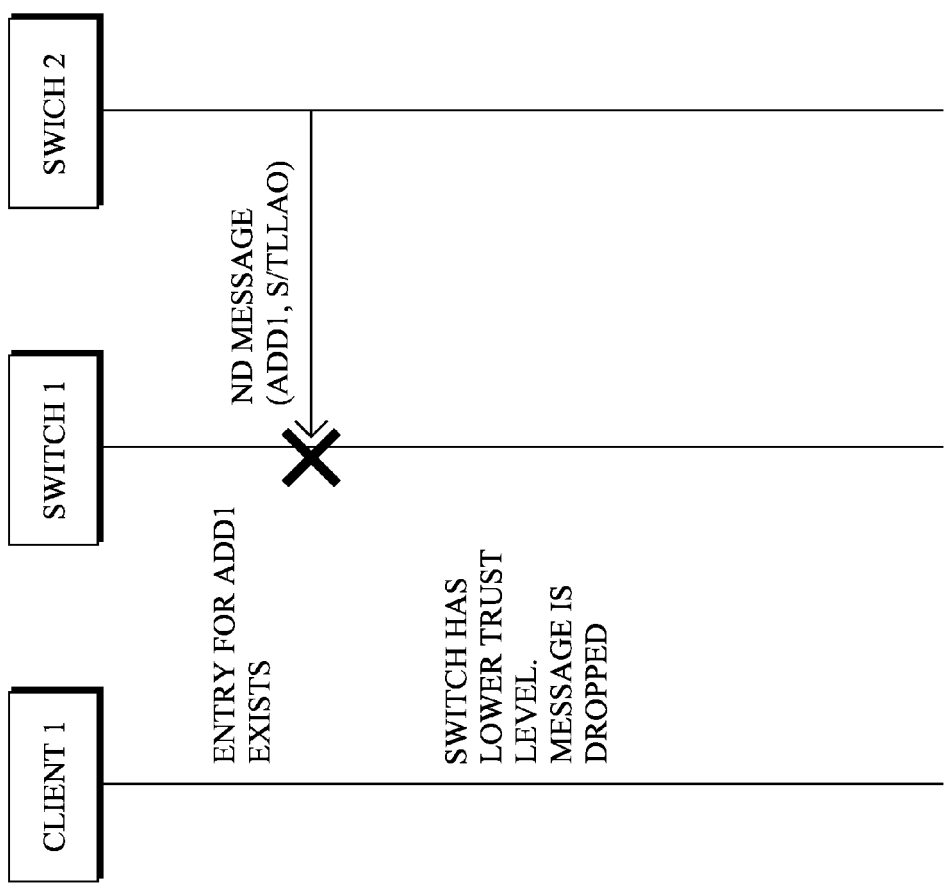

In FIG. 13, which illustrates the receipt of an S/T LLAO ND message from a switch, if Switch 2 sends an ND message (ADD1, S/TLLAO) back to Switch 1, which already has the existing entry for ADD1, then the message is dropped, since the Switch 2 has a lower trust level than Client 1.

Specifically according to the novel techniques described herein, FIGS. 14-23 illustrate example message exchange timing diagrams for multiswitch operation where a local port is not trusted.

Figure 14:
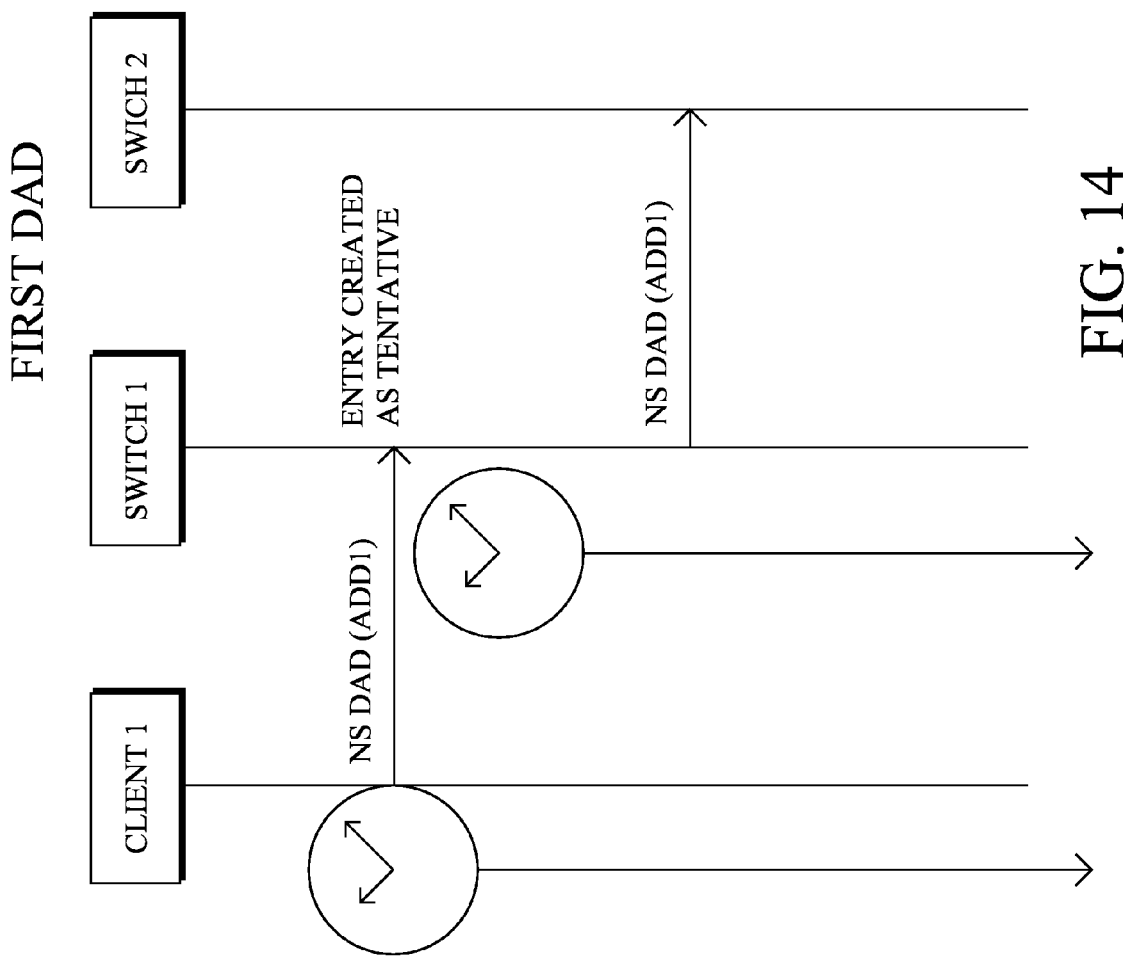
FIGS. 14-23 illustrate example message exchange timing diagrams for multiswitch operation where a local port is not trusted.

In FIG. 14, for instance, which illustrates the receipt of a first DAD message, Client 1 sends an NS DAD (ADD1) to Switch 1, and starts a delay timer. Upon receipt, Switch 1 creates an entry for ADD1 as TENTATIVE, and also starts a delay timer. During this delay, Switch 1 may forward the NS DAD (ADD1) to Switch 2.

Figure 15:
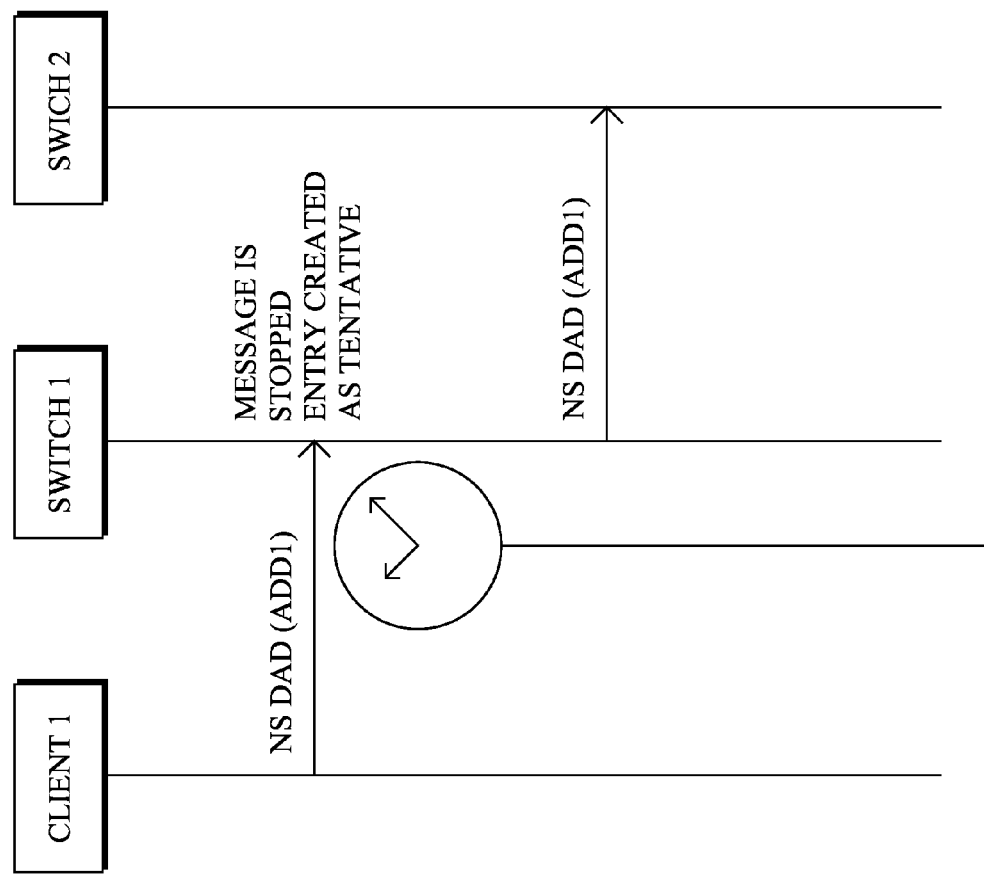

On the other hand, according to the techniques herein, in FIG. 15, upon receipt of a first non-DAD message, such as ND message (ADD1) from Client 1, Switch 1 also creates the entry as TENTATIVE and starts the delay timer, but the ND message is stopped. A new NS DAD (ADD1) message is then generated and forwarded to Switch 2.

Figure 16:
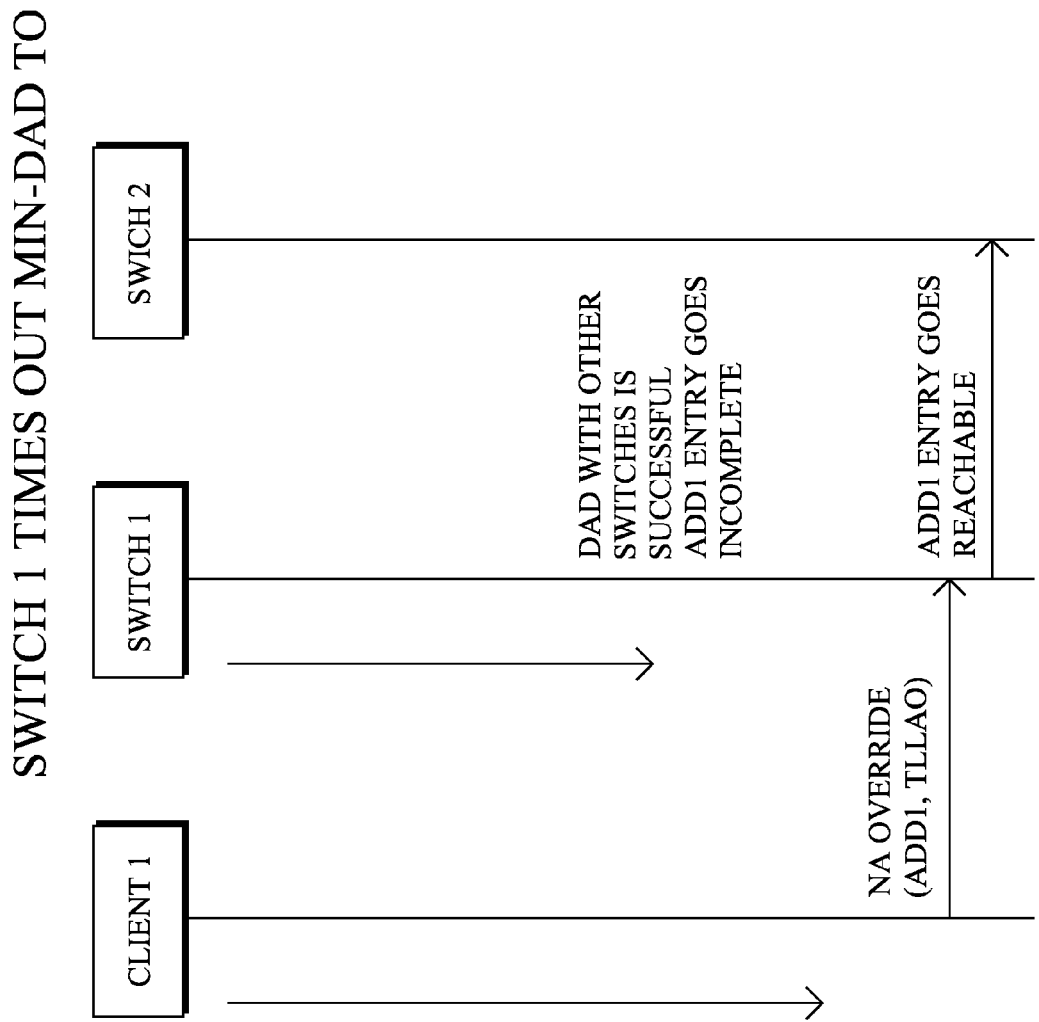

As shown in FIG. 16, Switch 1 times out its "Min-DAD TO" (timeout) value, and if the DAD operation with other switches is successful, the entry for ADD1 goes INCOMPLETE until Client 1 sends an NA Override (ADD1, TLLAO) message. At this time, the entry for ADD1 goes REACHABLE, which is relayed to Switch 2, accordingly.

Figure 17:
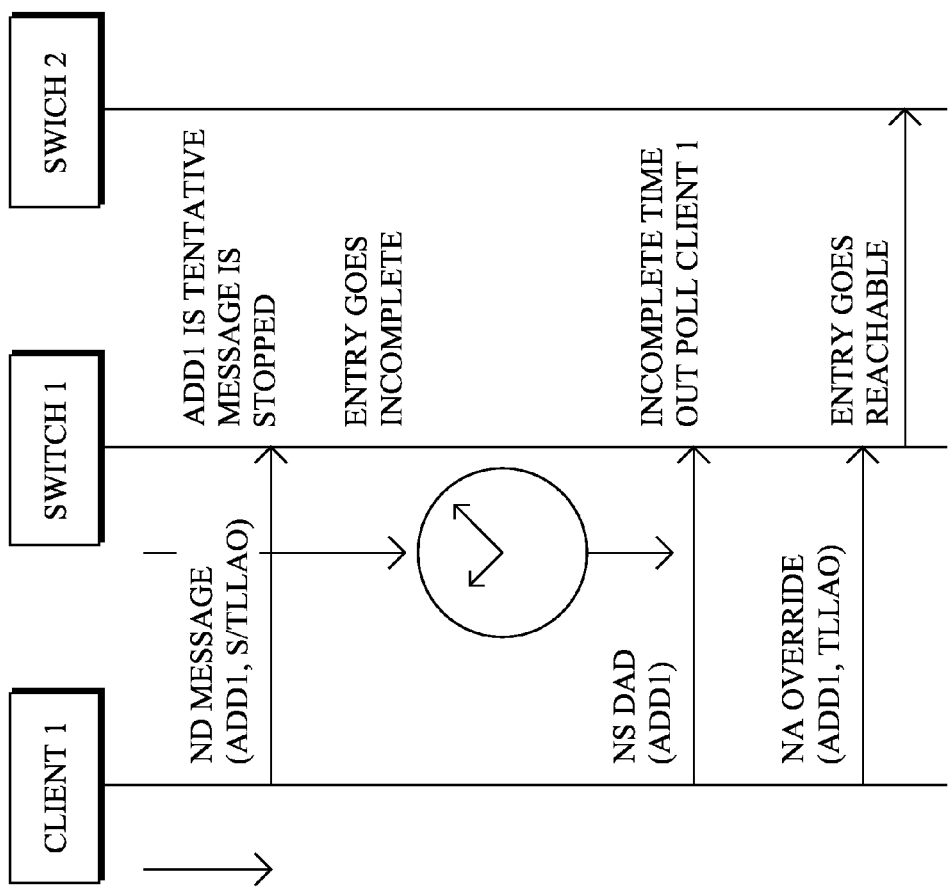

If, however, as shown in FIG. 17, the delay of Client 1 expires first, and an ND message (ADD1, no S/TLLAO) is received while ADD1 is still tentative at Switch 1, then the message is stopped. Eventually, the entry for ADD1 goes INCOMPLETE upon the TENTATIVE timer of Switch 1 expiring. If the INCOMPLETE state times out, Switch 1 would poll Client 1 by sending an NS DAD (ADD1) to Client 1. If Client 1 returns an NA Override (ADD1, TLLAO), then the entry for ADD1 at Switch 1 goes REACHABLE.

Figure 18:
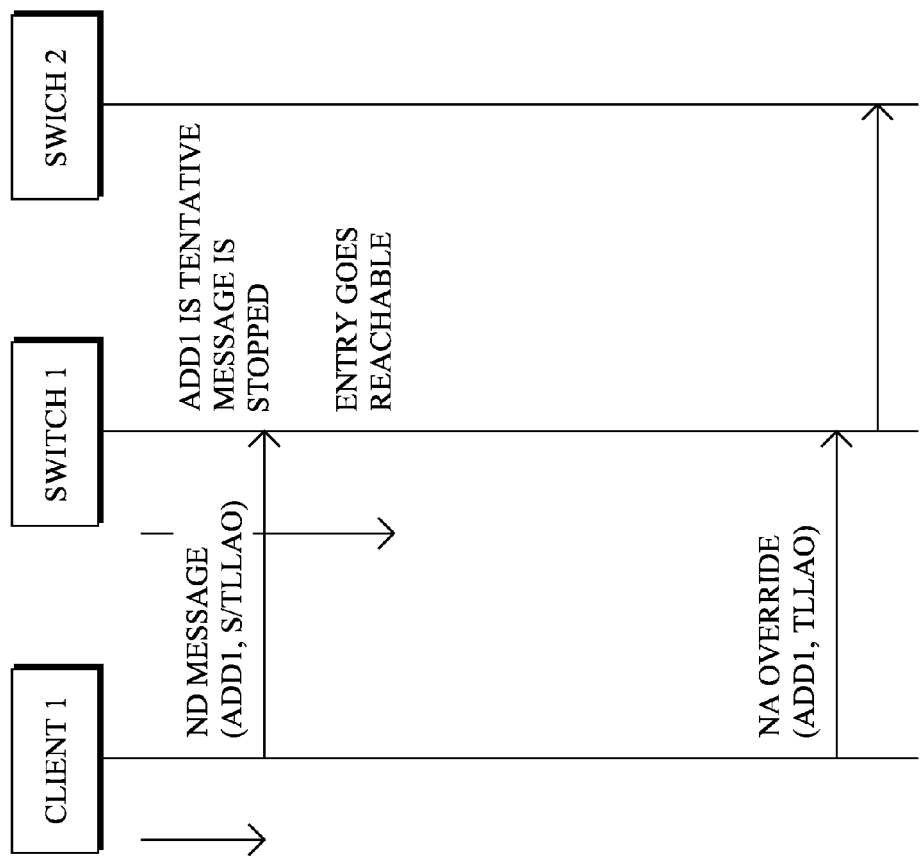

An ND/LLAO message being received in the TENTATIVE state is shown in FIG. 18. In particular, when Client 1 sends an ND message (ADD1, S/TLLAO) to Switch 1 while ADD1 is still TENTATIVE, Switch 1 drops the message. Eventually, the entry for ADD1 moves from TENTATIVE to REACHABLE. When Client 1 later sends an NA Override (ADD1, TLLAO) message, this is forwarded to Switch 2 since the entry for ADD1 is REACHABLE.

Figure 19:
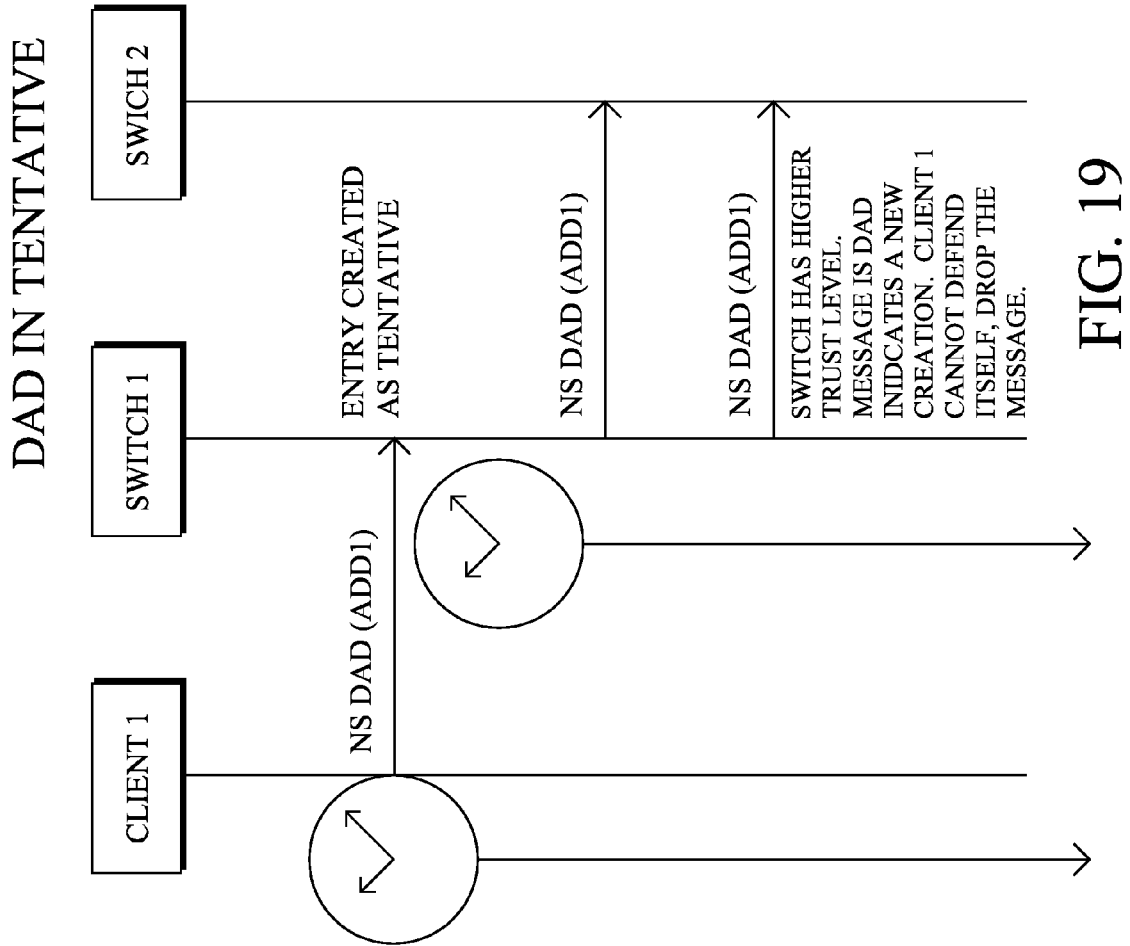

FIG. 19 illustrates the example of receiving a DAD message from a switch when the entry is already in TENTATIVE state. In particular, after Client 1 sends the NS DAD (ADD1), and the entry is created by Switch 1 in TENTATIVE state, forwarding the corresponding NS DAD (ADD1) as noted above. In the event Switch 2 sends its own NS DAD (ADD1) to Switch 1, according to the techniques herein, even if Switch 2 has a higher trust value and the new DAD message indicates new entry creation. Since Client 1 cannot defend itself, Switch 1 drops the message.

Figure 20:
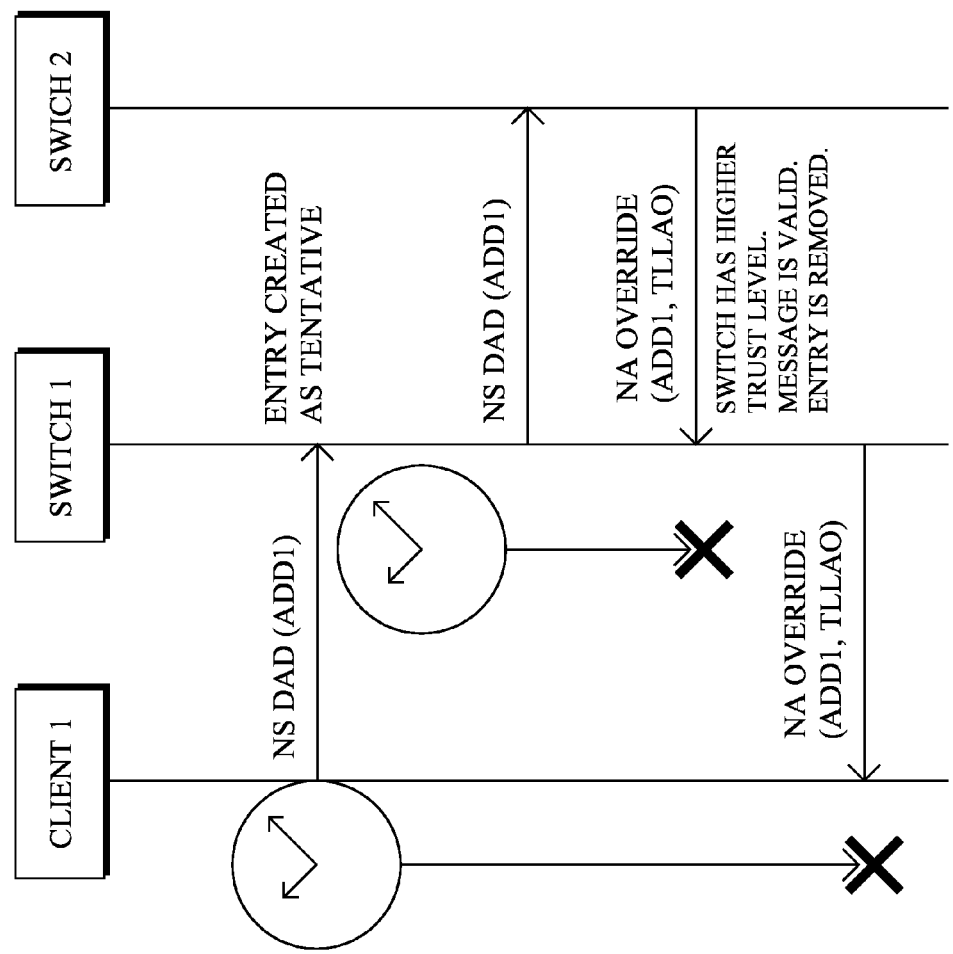

FIG. 20 illustrates the scenario when there is a conflict with a TENTATIVE entry. For example, after receiving an NS DAD (ADD1), and creating the entry as TENTATIVE (and forwarding the NS DAD (ADD1) to Switch 2), if Switch 2 sends an NA Override (ADD1, TLLAO), with higher trust, the message is valid, and the entry is removed. As such, an NA Override (ADD1, TLLAO) is sent to Client 1 to update its own entry state.

Figure 21:
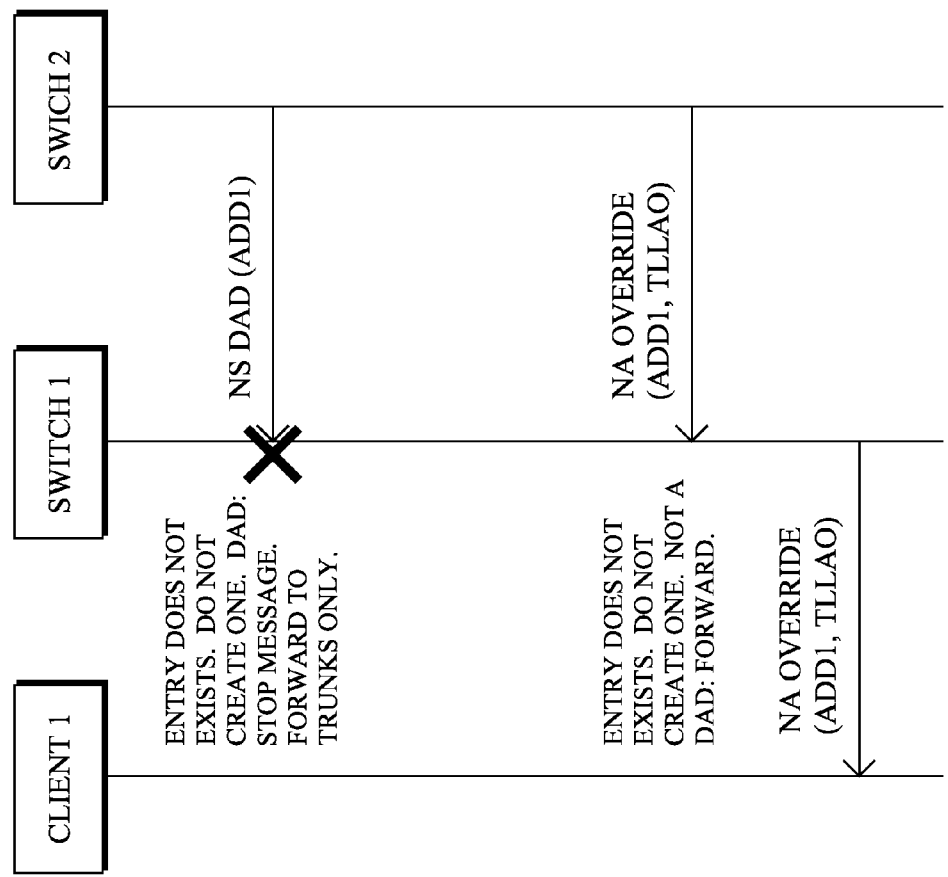

Still further, FIG. 21 illustrates a different example of receiving a DAD message from a switch. In particular, if Switch 1 receives an NS DAD (ADD1) from Switch 2, when an entry does not already exist, since the DAD message is from a switch, no entry is created, and the DAD message is stopped (forwarded to trunks only). When Switch 2 follows up with a NA Override (ADD1, TLLAO), the entry is still not created, but since the message is not a DAD, the NA Override (ADD1, TLLAO) is forwarded on to Client 1, accordingly.

Figure 22:
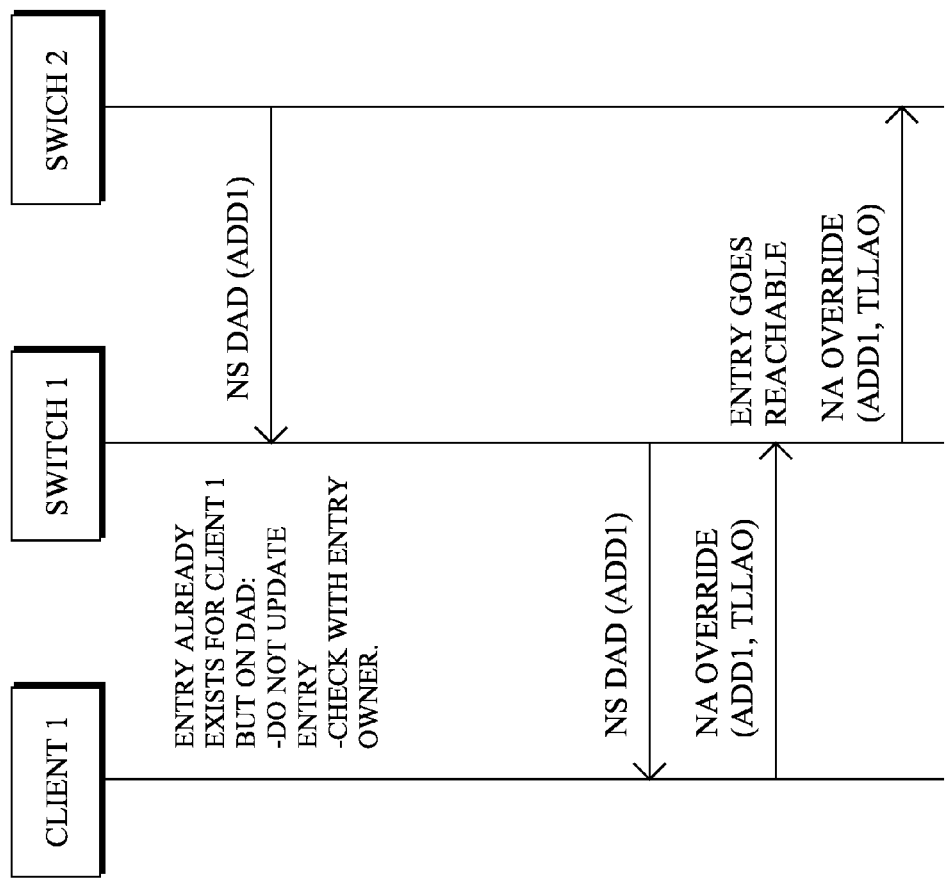

If, as shown in FIG. 22, the entry had existed already in FIG. 21, then the entry is still not updated, but now Switch 1 checks with the entry owner, Client 1, with an NS DAD (ADD1). If Client 1 responds with an NA Override (ADD1, TLLAO), the entry for ADD1 at Switch 1 goes REACHABLE, and the NA Override (ADD1, TLLAO) is forwarded to Switch 2.

Figure 23:
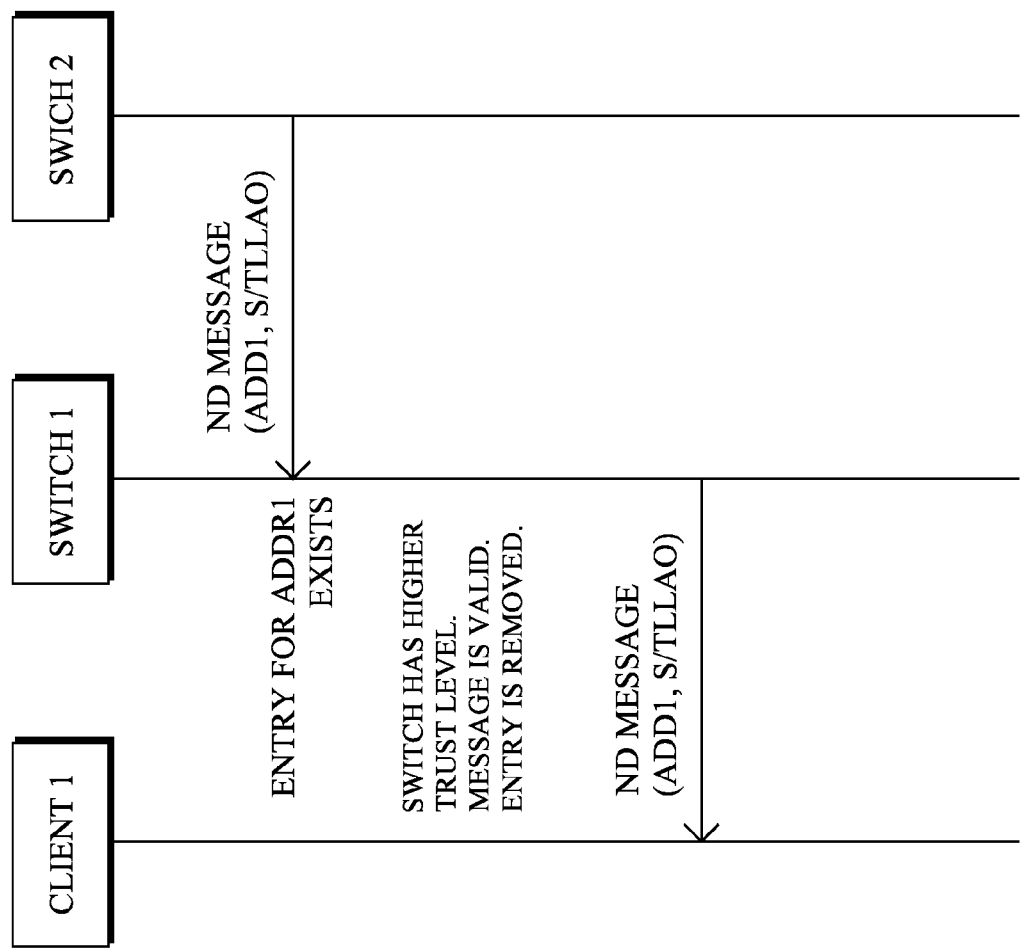
Figure 24:
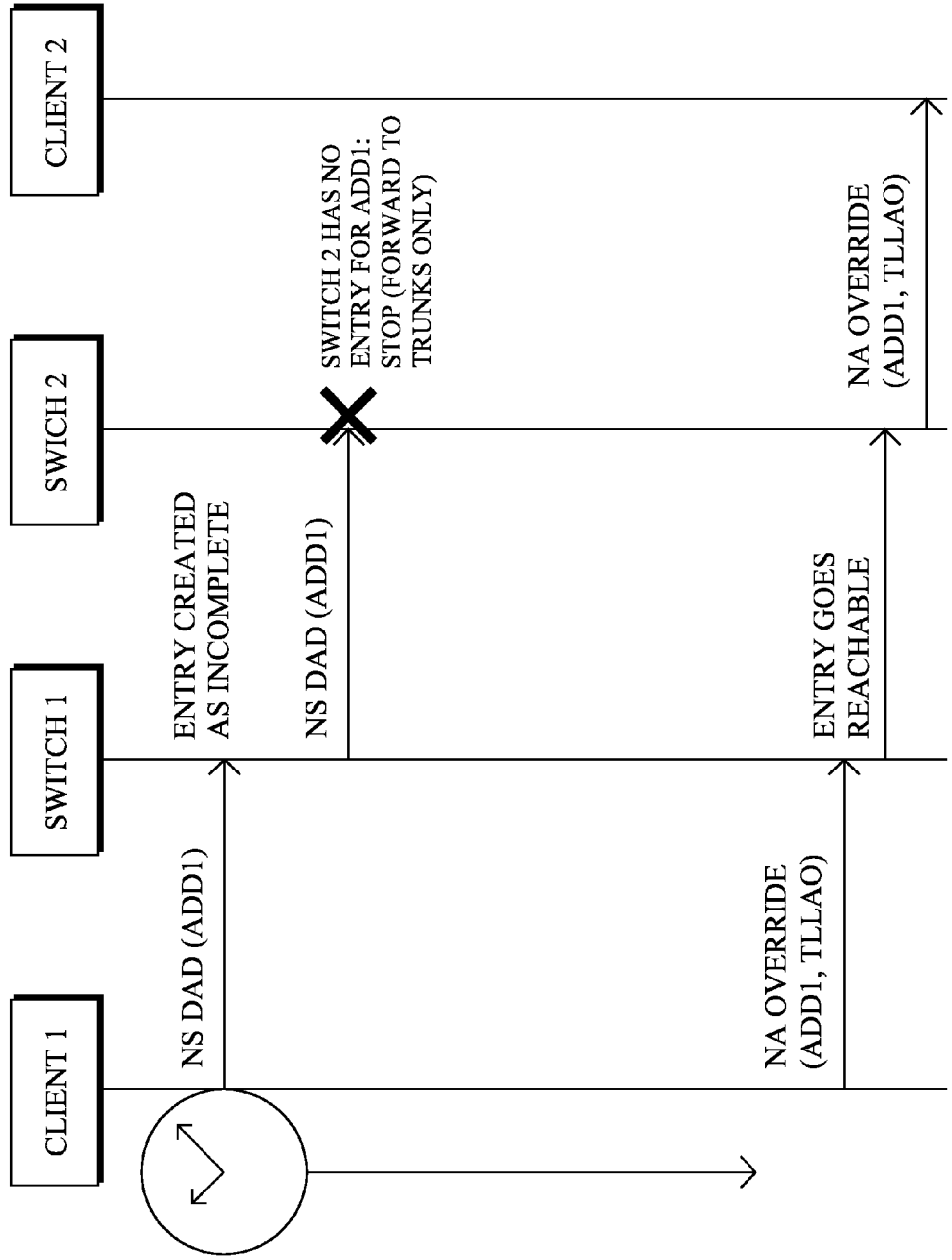
FIGS. 24-28 illustrate example message exchange timing diagrams for multiswitch flow examples based on trust.

Lastly, FIG. 23 illustrates the receipt of an ND message (ADD1, S/TLLAO) at Switch 1 from Switch 2, where the entry for ADD1 already exists. If Switch 2 has a higher trust level than the current entry, the message is valid, and the entry is removed (since the higher trust entry is from a switch). Correspondingly, the ND message (ADD1, S/TLLAO) is forwarded to Client 1.

In addition, FIGS. 24-28 illustrate example message exchange timing diagrams for multiswitch flow examples based on trust. In particular, in FIG. 24 (trusted device versus no entry) Client 1 may first send an NS DAD (ADD1) to Switch 1, and starts its delay timer, and Switch 1 creates the entry as INCOMPLETE, prior to forwarding the NS DAD (ADD1) to Switch 2. If Switch 2 has no entry for ADD1, it stops the message (forwarding to trunks only). Once Client 1 reaches the end of its delay, it sends an NA Override (ADD1, TLLAO) message to Switch 1, which allows the entry to go REACHABLE. At this time, Switch 2 may send the NA Override (ADD1, TLLAO) to Client 2, accordingly.

Figure 25:
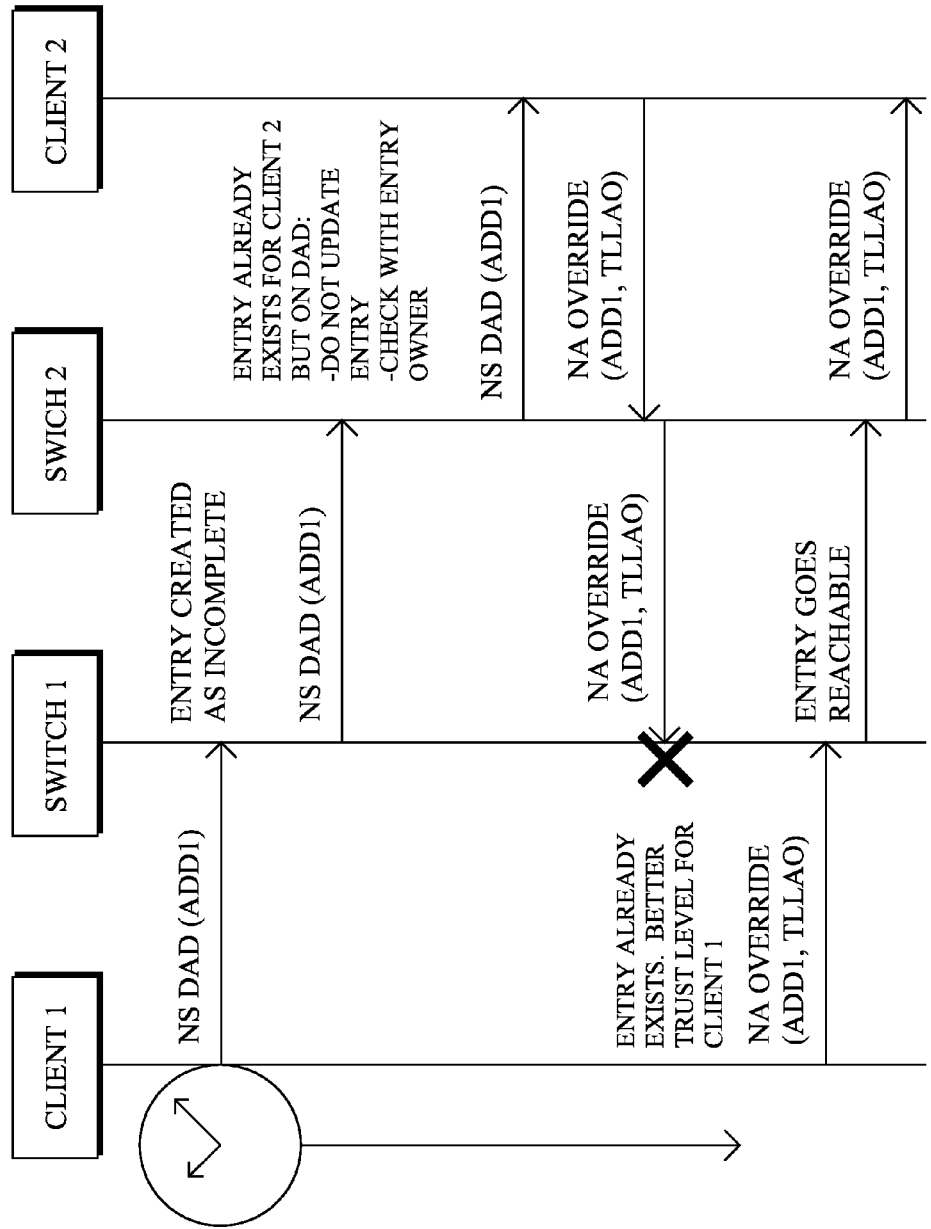

Alternatively, in FIG. 25 (trusted device versus a not trusted device), assume that when Switch 2 receives the first NS DAD (ADD1) from Switch 1, assuming that an entry exists on Switch 2 for Client 2 (for ADD1), Switch 2 does not update its entry, but checks with the entry owner, Client 2, with an NS DAD (ADD1). If Client 2 responds with an NA Override (ADD1, TLLAO), then Switch 2 forwards the NA Override (ADD1, TLLAO) to Switch 1, accordingly. However, since the entry already exists at Switch 1, and since Client 1 is a higher trust level than Switch 2, the NA Override is stopped. Once the delay at Client 1 expires, Client 1 may send an NA Override (ADD1, TLLAO), at which time the entry at Switch 1 goes REACHABLE, and the NA Override (ADD 1, TLLAO) propagates through to Client 2.

Figure 26:
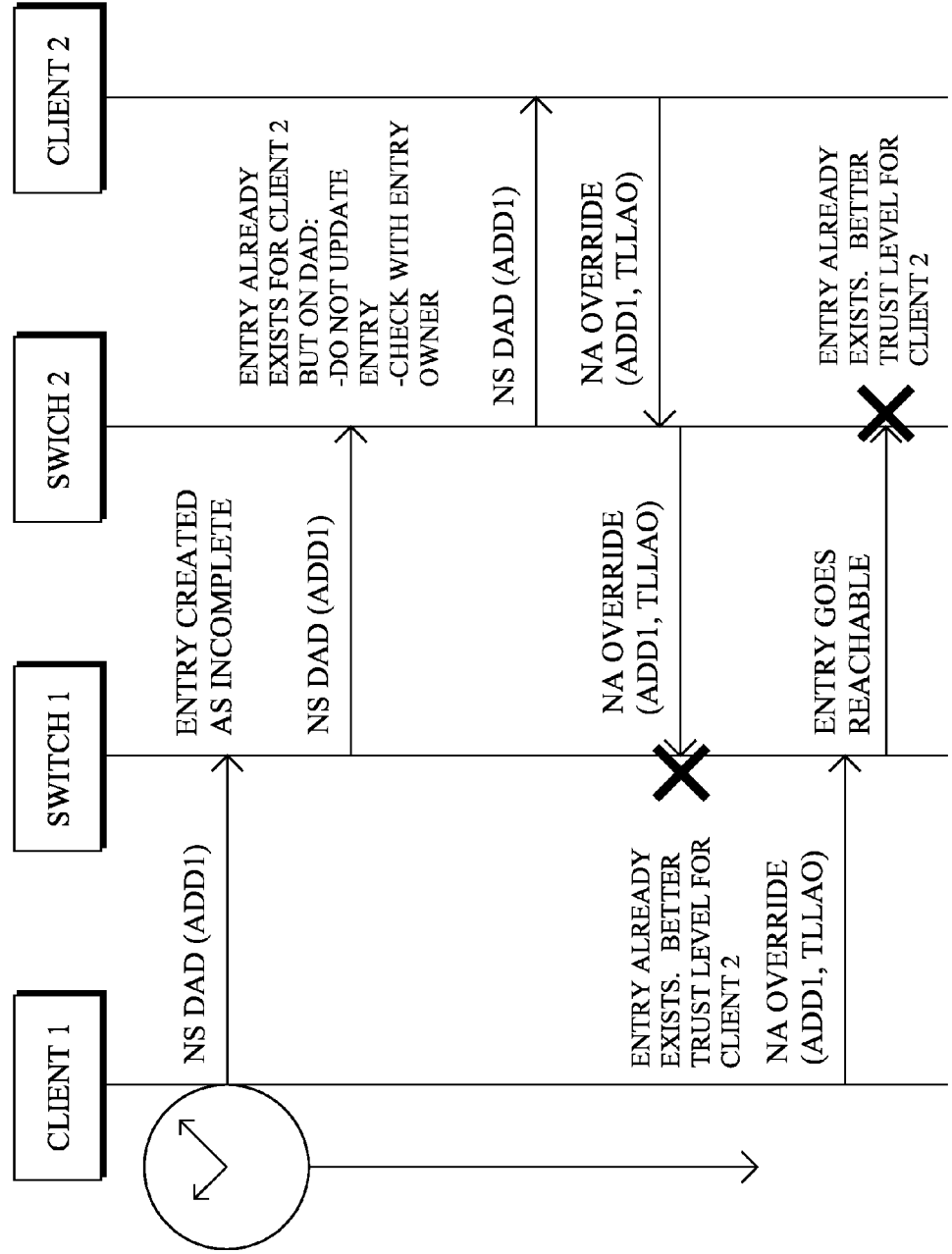

In FIG. 26 (trusted versus trusted), the same flow occurs as in FIG. 25, except now when the NA Override (ADD1, TLLAO) from Client 1 reaches Switch 2. At this time, since the entry for ADD1 already exists at Switch 2 for Client 2, notably at a better trust level than Switch 1, the entry is not changed based on the NA Override message.

In FIG. 26, it can thus be seen that there are state inconsistencies between Switch 1 and Switch 2. The NA messages are always propagated over the trunk, but they are dropped by the receiving switch. In the case of hot standby router protocol (HSRP) operation, one switch will maintain a wrong state until time out, and nodes on that switch will not be updated. In this instance, an ND suppress might defeat HSRP. According to an illustrative embodiment herein, therefore, this may be improved by checking the entry upon receiving an NA message from a switch.

Figure 27:
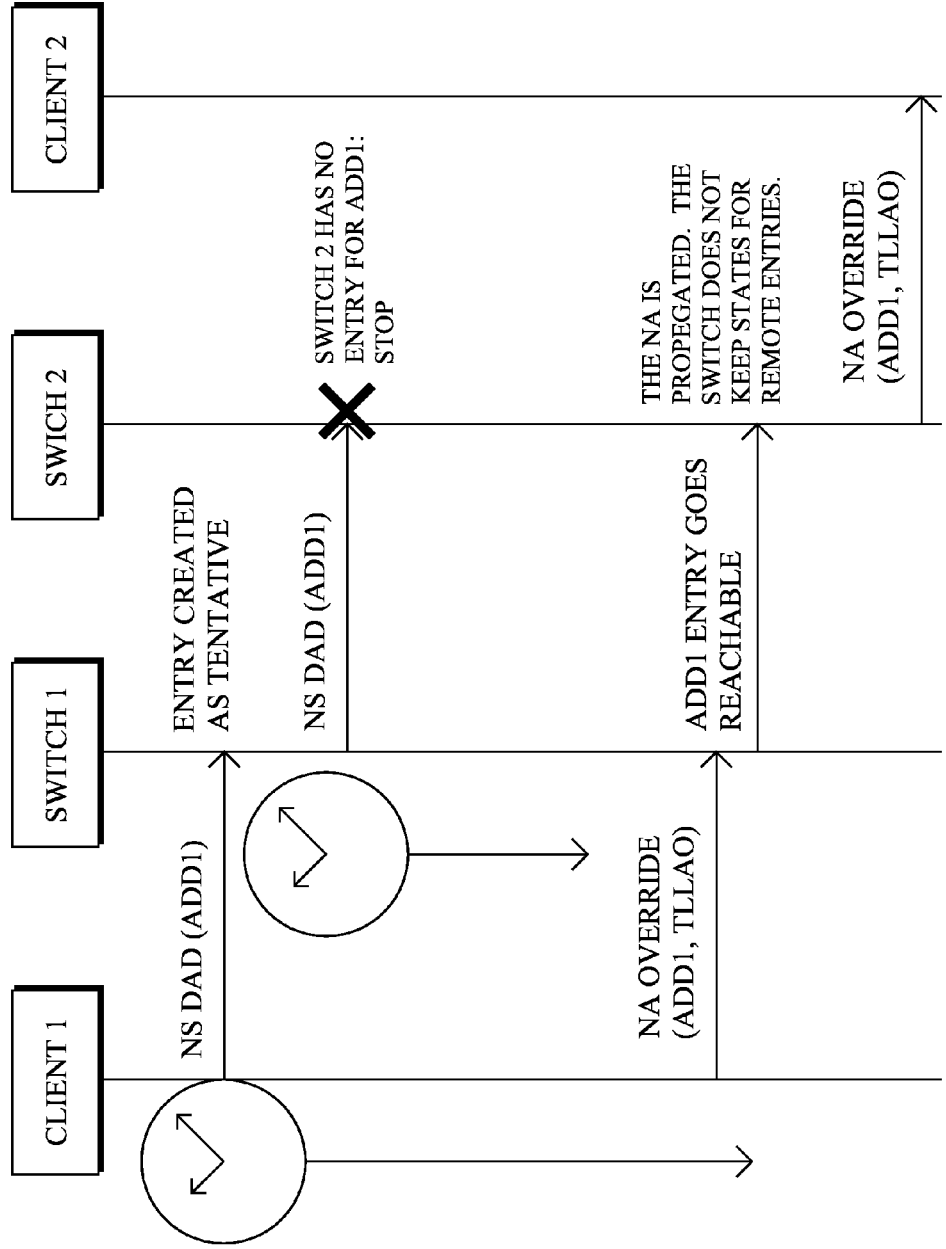

Continuing to FIG. 27, illustrating an untrusted device versus no entry, when Switch 1 receives an NS DAD (ADD1) from Client 1, it creates an entry as TENTATIVE, and forwards an NS DAD (ADD1) to Switch 2. Switch 2 has no entry for ADD1, and stops the NS DAD message, since it is from a switch, as described above. Once Client 1 sends the NA Override (ADD1, TLLAO) to Switch 1, the entry on Switch 1 goes REACHABLE, and the NA Override is propagated through to Client 2. At Switch 2, however, since the switch does not keep states for remote entries, no state is created.

Figure 28:
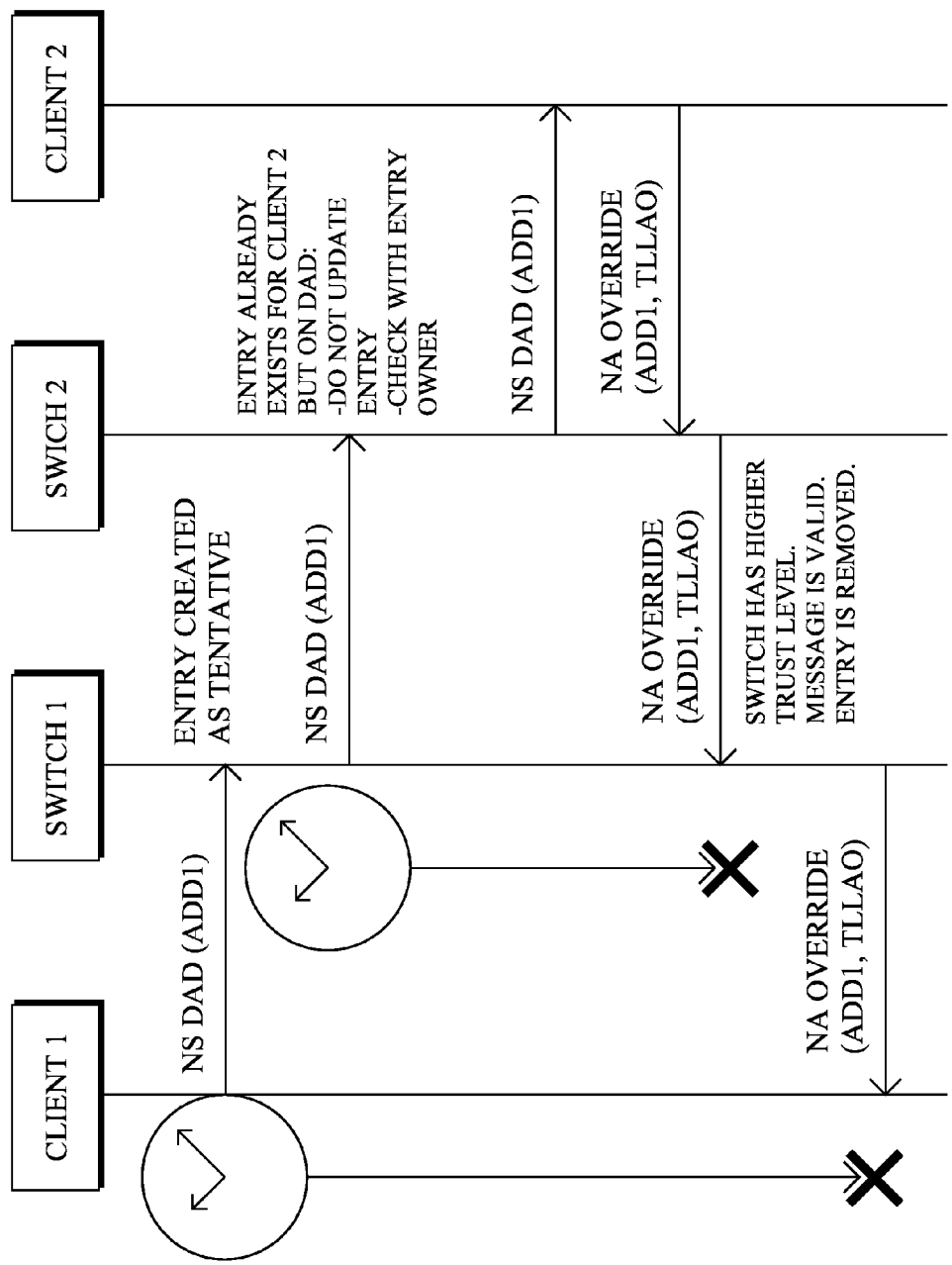

Lastly, FIG. 28 illustrates an untrusted device versus an existing entry, where now the NS DAD (ADD1) from Client 1 is propagated through to Client 2 by Switch 2 in order to check the address with the entry owner, as noted above. If Client 2 responds with an NA Override (ADD1, TLLAO), this is forwarded through Switch 2 to Switch 1. If the switch has a higher trust level at Switch 1 than Client 1 does, then the message is valid, and the entry is removed (being from a switch). The NA Override (ADD1, TLLAO) is then forwarded to Client 1 so Client 1 can adjust its state for the address, accordingly.

It should be noted that the exchanges shown in FIGS. 8-28 are merely examples for illustration, and certain other steps/exchanges may be included or excluded as desired. Moreover, while FIGS. 8-28 are shown in a particular order, this ordering is not meant to mandate an order of exchanges between figures, unless explicitly noted, and the ordering is thus not meant to limit the scope of the embodiments herein.

The techniques described herein, therefore, provide for management of address validation states in switches snooping IPv6. In particular, the techniques herein distribute ND binding table states in switches in a manner that protects the first device that claims an address, while still allowing for some override by a configurable trust relationship. That is, the techniques herein protect the network against rogue devices that steal addresses that are seen from a DAD exchange, e.g., protecting at layer-3 (L3) when allowing un-trusted access at layer-2 (L2).

In particular, the techniques herein provide for at least a few key differences from the current mechanisms proposed by SAVI. First, the techniques herein maintain entries for trusted nodes when they are directly connected (as opposed to over trunks via another switch). In addition, the techniques herein establish a different DAD flow by using DAD to recognize when an entry is created for an untrusted node in the switch and generating a DAD for whatever ND message is received from the node to create that entry. Moreover, the techniques herein support a centralized registrar switch or a few switches with a Distributed Hash Table (DHT) to find out which switch has the entry for a given address.

In this last case, for instance, the switch may transform a classical ND flow into a registration to the registrar. As such, a classical (multicast based) ND in the access (e.g., client-switch communication) can be transformed into either another classical ND or else an ND registration mechanism in the switch fabric (e.g., switch-switch communication), as described herein. Notably, a further extension may also operate in the reverse, where an ND registration from a client may also be transformed into either mode in the switched fabric, i.e., to classical ND or an ND registration mechanism. In the description above, for example, the DAD from a client may be replaced by an ND registration. This registration does not go beyond the first receiving switch, and the output of that switch upon registration may be as described above, i.e., a generated NS DAD according to the flows as described for NS DAD operation. Examples of ND registration that may be used herein may be found in the IETF Internet Draft entitled "LoWPAN Backbone Router"<draft-thubert-lowpan-backbone-router> by Thubert (Nov. 4, 2007 edition), which became "Neighbor Discovery Optimization for Low Power and Lossy Networks (6LoWPAN)"<draft-ietf-6lowpan-nd> by Shelby et al. (Oct. 24, 2011 edition), the contents of each of which incorporated by reference in their entirety herein.

While there have been shown and described illustrative embodiments that provide management of address validation states in switches snooping IPv6, it is to be understood that various other adaptations and modifications may be made within the spirit and scope of the embodiments herein. For example, the embodiments have been shown and described herein with relation to DAD messages according to current standards, such as those addressed by SAVI. However, the embodiments in their broader sense are not as limited, and may, in fact, be used with other suitable standards, including, but not limited to, future versions of the Internet Protocol that utilize similar messages to the DAD messages of IPv6.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving a neighbor discovery (ND) message from a non-trusted non-switch device, the ND message having an associated address;
   creating and storing a corresponding binding entry for the address in a temporary tentative state without forwarding the ND message, wherein the temporary tentative state indicates a probable state of the non-trusted non-switch device;
   generating and forwarding a first duplicate address detection (DAD) message on behalf of the non-trusted non-switch device; and
   in response to receiving a second DAD message from a non-owner device:
   determining whether a corresponding second address of the second ND message is already an entry in a tentative state;
   dropping the second DAD message when the corresponding second address of the second DAD message is stored as the tentative-state entry; and
   forwarding the second DAD message to a corresponding owner device of the second address for neighbor advertisement (NA) defense when the second address is not stored as a tentative-state entry.

2. The method as in claim 1, further comprising:
   determining whether the address of the ND message is already an entry in a tentative state; and
   creating the entry and forwarding the DAD message only in response to the address not already being an entry in the tentative state.

3. The method as in claim 1, further comprising:
   receiving a non-DAD message from a first device that is more trusted than a second device currently owning a particular entry corresponding to an address of the non-DAD message;
   giving away the current entry to the first device; and
   passing the non-DAD message to the second device.

4. The method as in claim 3, further comprising:
in response to the first device being a switch, removing the particular entry; and
in response to the first device not being a switch, updating the particular entry to reflect the first device as the owner of the address of the non-DAD message.

5. The method as in claim 1, further comprising:
receiving another ND message from a switch; and
in response to the other ND message being from a switch, not creating a binding entry.

6. The method as in claim 1, wherein the temporary tentative state lasts for 800 ms.

7. The method as in claim 1, wherein forwarding the DAD message comprises unicasting the DAD message to a registry configured to maintain a database of entries.

8. The method as in claim 7, further comprising:
determining, by the registry whether the registry has a registered device for the address;
in response to a registered device, forwarding the DAD message from the registry to the registered switch; and
in response to no registered device, dropping the DAD message at the registry.

9. The method as in claim 1, wherein forwarding the DAD message comprises multicasting the DAD message in response to there being no registry to maintain a database of entries.

10. An apparatus, comprising:
one or more network interfaces to communicate in a computer network;
a processor coupled to the network interfaces and adapted to execute one or more processes; and
a memory configured to store a process executable by the processor, the process when executed operable to:
receive a neighbor discovery (ND) message from a non-trusted non-switch device, the ND message having an associated address;
create and store a corresponding binding entry for the address in a temporary tentative state without forwarding the ND message, wherein the temporary tentative state indicates a probable state of the non-trusted non-switch device;
generate and forward a first duplicate address detection (DAD) message on behalf of the non-trusted non-switch device; and
in response to receipt of a second DAD message from a non-owner device:
determine whether a corresponding second address of the second ND message is already an entry in a tentative state;
drop the second DAD message when a corresponding second address of the second DAD message is stored as a tentative-state entry; and
forward the second DAD message to a corresponding owner device of the second address for neighbor advertisement (NA) defense when the second address is not stored as a tentative-state entry.

11. The apparatus as in claim 10, wherein the process when executed is further operable to:
determine whether the address of the ND message is already an entry in a tentative state; and
create the entry and forwarding the DAD message only in response to the address not already being an entry in the tentative state.

12. The apparatus as in claim 10, wherein the process when executed is further operable to:
receive a non-DAD message from a first device that is more trusted than a second device currently owning a particular entry corresponding to an address of the non-DAD message;
give away the current entry to the first device; and
pass the non-DAD message to the second device.

13. The apparatus as in claim 12, wherein the process when executed is further operable to:
remove the particular entry in response to the first device being a switch; and
update the particular entry to reflect the first device as the owner of the address of the non-DAD message in response to the first device not being a switch.

14. The apparatus as in claim 10, wherein the process when executed is further operable to:
receive another ND message from a switch; and
in response to the other ND message being from a switch, not create a binding entry.

15. The apparatus as in claim 10, wherein the temporary tentative state lasts for 800 ms.

16. The apparatus as in claim 10, wherein the process when executed to forward the DAD message is operable to unicast the DAD message to a registry configured to maintain a database of entries.

17. The apparatus as in claim 10, wherein the process when executed to forward the DAD message is operable to multicast the DAD message in response to there being no registry to maintain a database of entries.

18. A tangible, non-transitory, computer-readable media having software encoded thereon, the software when executed by a processor operable to:
receive a neighbor discovery (ND) message from a non-trusted non-switch device, the ND message having an associated address;
create and store a corresponding binding entry for the address in a temporary tentative state without forwarding the ND message, wherein the temporary tentative state indicates a probable state of the non-trusted non-switch device;;
generate and forward a first duplicate address detection (DAD) message on behalf of the non-trusted non-switch device; and
in response to receipt of a second DAD message from a non-owner device:
determine whether a corresponding second address of the second ND message is already an entry in a tentative state;
drop the second DAD message when a corresponding second address of the second DAD message is stored as a tentative-state entry; and
forward the second DAD message to a corresponding owner device of the second address for neighbor advertisement (NA) defense when the second address is not stored as a tentative-state entry.

19. The computer-readable media as in claim 18, wherein the software when executed is further operable to:
determine whether the address of the ND message is already an entry in a tentative state; and
create the entry and forwarding the DAD message only in response to the address not already being an entry in the tentative state.

20. The computer-readable media as in claim 18, wherein the software when executed is further operable to:
receive a non-DAD message from a first device that is more trusted than a second device currently owning a particular entry corresponding to an address of the non-DAD message;

give away the current entry to the first device; and
pass the non-DAD message to the second device.

* * * * *

UNITED STATES PATENT AND TRADEMARK OFFICE
CERTIFICATE OF CORRECTION

PATENT NO. : 9,270,638 B2  
APPLICATION NO. : 13/355032  
DATED : February 23, 2016  
INVENTOR(S) : Pascal Thubert et al.

Page 1 of 1

It is certified that error appears in the above-identified patent and that said Letters Patent is hereby corrected as shown below:

In the Specification

Column 1, Line 26, should read:  
of a first-come-first-serve protection against rogue devices Signed and Sealed this  
Twenty-sixth Day of January, 2021

Drew Hirshfeld  
*Performing the Functions and Duties of the*  
*Under Secretary of Commerce for Intellectual Property and*  
*Director of the United States Patent and Trademark Office*